US012757061B2

(12) United States Patent
Lee et al.

(10) Patent No.: US 12,757,061 B2
(45) Date of Patent: Oct. 6, 2026

(54) ELECTRONIC DEVICE FOR SUPPORTING NON-TERRESTRIAL NETWORK AND OPERATION METHOD THEREOF

(71) Applicant: SAMSUNG ELECTRONICS CO., LTD., Suwon-si (KR)

(72) Inventors: Keonyoung Lee, Suwon-si (KR); Minwoong Cho, Suwon-si (KR); Hyeyeon Kong, Suwon-si (KR); Sunmin Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 440 days.

(21) Appl. No.: 18/507,476

(22) Filed: Nov. 13, 2023

(65) Prior Publication Data

US 2024/0251279 A1 Jul. 25, 2024

Related U.S. Application Data

(63) Continuation of application No. PCT/KR2023/015860, filed on Oct. 13, 2023.

(30) Foreign Application Priority Data

Jan. 25, 2023 (KR) ........................ 10-2023-0009477
Feb. 16, 2023 (KR) ........................ 10-2023-0020948

(51) Int. Cl.
*H04W 28/02* (2009.01)
*H04W 4/14* (2009.01)
*H04W 84/06* (2009.01)

(52) U.S. Cl.
CPC ......... *H04W 28/0231* (2013.01); *H04W 4/14* (2013.01); *H04W 84/06* (2013.01)

(58) Field of Classification Search
CPC ... H04W 28/0231; H04W 4/14; H04W 84/06; H04W 8/24; H04W 48/02; H04W 48/10; H04W 76/10; H04B 7/185
See application file for complete search history.

(56) References Cited

U.S. PATENT DOCUMENTS 5,490,087 A 2/1996 Redden et al.
5,887,257 A 3/1999 Olds
(Continued)

FOREIGN PATENT DOCUMENTS

CN 111629400 A 9/2020
JP 2020517161 A 6/2020
(Continued)

OTHER PUBLICATIONS

Qi, Fei, and Weiliang Xie. "Enhancing IoT services in 6G non-terrestrial networks with multicast massive MIMO." IEEE Network 38.4 (2024): 88-95. (Year: 2024).*
(Continued)

*Primary Examiner* — Sharad Rampuria
(74) *Attorney, Agent, or Firm* — Nixon & Vanderhye, P.C.

(57) ABSTRACT

In an electronic device and an operation method of an electronic device according to various embodiments, the electronic device may include: a communication circuit configured to support cellular communication through a terrestrial network and a non-terrestrial network, a memory configured to store mapping data in which identification information of the non-terrestrial network and services supported by the non-terrestrial network are mapped, and a communication processor, wherein the communication processor may be configured to: identify, while connecting to a network through a node, whether the network including the node is the non-terrestrial network, based on system information received from the node, identify, based on the
(Continued)

network being the non-terrestrial network, services supported by the network, based on the mapping data, and prohibit transmission of a request message for establishment of a packet data unit (PDU) session for a service, which is not supported by the network, to the network.

20 Claims, 12 Drawing Sheets

(56) References Cited

U.S. PATENT DOCUMENTS

| | | | | |
|---|---|---|---|---|
| 5,946,618 | A | 8/1999 | Agre et al. | |
| 9,467,977 | B2 | 10/2016 | Hong | |
| 10,649,064 | B2 | 5/2020 | Edge et al. | |
| 10,985,833 | B2 | 4/2021 | Mendelsohn et al. | |
| 11,218,933 | B2 | 1/2022 | Edge | |
| 11,356,893 | B2 | 6/2022 | Youn et al. | |
| 11,528,644 | B2 | 12/2022 | Cheng | |
| 11,696,189 | B2 | 7/2023 | Xu et al. | |
| 2021/0143897 | A1 | 5/2021 | Edge | |
| 2021/0250816 | A1 | 8/2021 | Xu et al. | |
| 2021/0376919 | A1 | 12/2021 | Lin et al. | |
| 2022/0200694 | A1 | 6/2022 | Kang et al. | |
| 2022/0225266 | A1* | 7/2022 | Kumar | H04W 48/04 |
| 2022/0322350 | A1 | 10/2022 | Sayenko et al. | |
| 2022/0376779 | A1 | 11/2022 | Atungsiri et al. | |
| 2022/0386259 | A1 | 12/2022 | Chen et al. | |
| 2022/0416880 | A1 | 12/2022 | Song et al. | |
| 2023/0164847 | A1* | 5/2023 | Kim | H04W 72/0453 370/329 |
| 2023/0292371 | A1* | 9/2023 | Rune | H04W 74/0833 |
| 2024/0031300 | A1 | 1/2024 | Liu et al. | |
| 2024/0063894 | A1 | 2/2024 | Vogedes et al. | |

FOREIGN PATENT DOCUMENTS

| | | | |
|---|---|---|---|
| KR | 10-1998-0063765 | | 10/1998 |
| KR | 10-2000-0053067 | | 8/2000 |
| KR | 101964349 | B1 | 4/2019 |
| KR | 20200110619 | A | 9/2020 |
| KR | 20210025502 | A | 3/2021 |
| KR | 20210043577 | A | 4/2021 |
| KR | 20210126465 | A | 10/2021 |
| KR | 10-2022-009882 | A | 1/2022 |
| KR | 20220135793 | A | 10/2022 |
| KR | 20220136948 | A | 10/2022 |
| KR | 20220137420 | A | 10/2022 |
| KR | 20220139306 | A | 10/2022 |
| KR | 10-2023-0000804 | A | 1/2023 |
| WO | 2018190794 | A1 | 10/2018 |
| WO | 2020211586 | A1 | 10/2020 |
| WO | 2022/116855 | A1 | 6/2022 |
| WO | 2022/154447 | | 7/2022 |
| WO | 2022/155177 | A1 | 7/2022 |
| WO | 2022/217613 | | 10/2022 |

OTHER PUBLICATIONS

International Search Report and Written Opinion dated Jan. 18, 2024 in corresponding International Patent Application No. PCT/KR2023/015860.

Intel Corporation et al., "Discussion on remaining issues on NTN UE capabilities," R2-2204843, 3GPP TSG-RAN WG2 Meeting # 118-e, E-Meeting, May 9-20, 2022.

Extended European Search Report dated Mar. 10, 2026 issued in European Patent Application No. 23918736.2.

* cited by examiner

ELECTRONIC DEVICE FOR SUPPORTING NON-TERRESTRIAL NETWORK AND OPERATION METHOD THEREOF

CROSS-REFERENCE TO RELATED APPLICATIONS

This application is a continuation of International Application No. PCT/KR2023/015860 designating the United States, filed on Oct. 13, 2023, in the Korean Intellectual Property Receiving Office and claiming priority to Korean Patent Application Nos. 10-2023-0009477, filed on Jan. 25, 2023, in the Korean Intellectual Property Office, and 10-2023-0020948, filed on Feb. 16, 2023, in the Korean Intellectual Property Office, the disclosures of each of which are incorporated by reference herein in their entireties.

BACKGROUND

Field

The disclosure relates to an electronic device and an operation method of the electronic device and to an electronic device supporting a non-terrestrial network.

Description of Related Art

In order to meet the increasing demand for wireless data traffic following the commercialization of the 4G communication system, efforts are being made to develop an improved 5G communication system or pre-5G communication system. For this reason, the 5G communication system or pre-5G communication system is called a beyond-4G network communication system or a post-LTE system. In order to attain high data rates, the 5G communication system is being considered to be implemented in ultra-high frequency (mmWave) bands (e.g., bands of 6 GHz or more) in addition to the bands (bands below 6 GHz) used in LTE. In the 5G communication system, beamforming, massive MIMO, full-dimension MIMO (FD-MIMO), array antenna, analog beamforming, and large scale antenna technologies are being discussed.

Recently, the provision of communication services using entities, which are not fixed on the ground, as well as base stations fixed on the ground, has been considered in the 5th generation communication system. According to an embodiment, the 5th generation communication system is considering the implementation of cellular communication using satellites. An electronic device may perform cellular communication using satellites when it is difficult to connect with a base station. Cellular communication using satellites may realize wider coverage than cellular communication using base stations due to the characteristics of satellites moving in Earth's orbit. Cellular communication using satellites is attracting attention in terms of reducing shadow areas where communication services are not available.

However, cellular communication using satellites has lower transmission and/or reception rates than cellular communication using base stations, so it may be used in providing limited services (e.g., a short message service (SMS) or voice calls).

An electronic device may attempt to discover a non-terrestrial network that performs data communication via satellites. The electronic device may attempt to connect to the discovered non-terrestrial network and, when the connection is completed, transmit and/or receive data via the satellites.

If there is a long distance between the electronic device and the satellite, path loss on the data transmission or reception path between the electronic device and the satellite may increase, and the time it takes for the electronic device to transmit or receive data may increase.

Furthermore, since the strength of a signal output from the electronic device is limited, the transmission data rate of the electronic device may be lowered. Therefore, communication services through non-terrestrial networks may be used within a limited scope. According to an example, a non-terrestrial network providing communication services using satellites may provide only specific services (e.g., a short messaging service (SMS) and a multimedia messaging service (MMS)) and may not provide other services (e.g., transmission and/or reception of user data).

The electronic device may transmit a signal requesting a specific service (e.g., transmission of user data) (e.g., requesting establishment of a packet data unit (PDU) session for user data transmission) to a network through a satellite. If the network is unable to provide the specific service, a reject message may be transmitted to the electronic device via the satellite in response to the request signal. It may take a long time for the electronic device to receive the reject message due to the relatively long distance between the electronic device and the satellite, and unnecessary power consumption and/or delay time may occur until the reject message is received.

SUMMARY

An electronic device according to an embodiment may include a communication circuit configured to support cellular communication through a terrestrial network and a non-terrestrial network. The electronic device may include a memory configured to store mapping data in which identification information of the non-terrestrial network and services supported by the non-terrestrial network are mapped. The electronic device may include a communication processor. The communication processor may identify, while connecting to a network through a node, whether the network including the node is the non-terrestrial network, based on system information received from the node. The communication processor may identify, based on the network being the non-terrestrial network, services supported by the network, based on the mapping data. The communication processor may prohibit transmission of a request message for establishment of a packet data unit (PDU) session for a service, which is not supported by the network, to the network.

A method of operating an electronic device according to an example embodiment may include identifying, while connecting to a network through a node, whether the network including the node is a non-terrestrial network, based on system information received from the node. The method may include identifying, based on the network being the non-terrestrial network, services supported by the network, based on mapping data in which identification information of the non-terrestrial network and services supported by the non-terrestrial network are mapped. The method may prohibit transmission of a request message for establishment of a packet data unit (PDU) session for a service, which is not supported by the network, to the network.

An electronic device and a method of operating the electronic device according to an embodiment may identify services supported by a non-terrestrial network and prohibit a request message for establishing a PDU session for a service that is not supported by the non-terrestrial network from being transmitting, to a network. Therefore, the electronic device may not transmit a message requesting the establishment of a PDU session for a service, which is not supported by the non-terrestrial network, to the network, thereby reducing unnecessary consumption of resources or delay time caused by reception of a reject message that occurs when a signal requesting the establishment of a PDU session for a service, which is not supported by the non-terrestrial network, is transmitted.

An electronic device and method of operating the electronic device according to an embodiment may receive a user equipment (UE) capability request message from a network and transmit, to the network, UE capability information excluding information that is not related to the network. The electronic device may reduce the amount of UE capability information by excluding information that is not related to the network, so that the electronic device may reduce the time (or delay time) required to transmit UE capability information.

The effects obtainable from the disclosure are not limited to the effects mentioned above, and other effects not mentioned will be clearly understood by those skilled in the art to which the disclosure pertains from the description below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
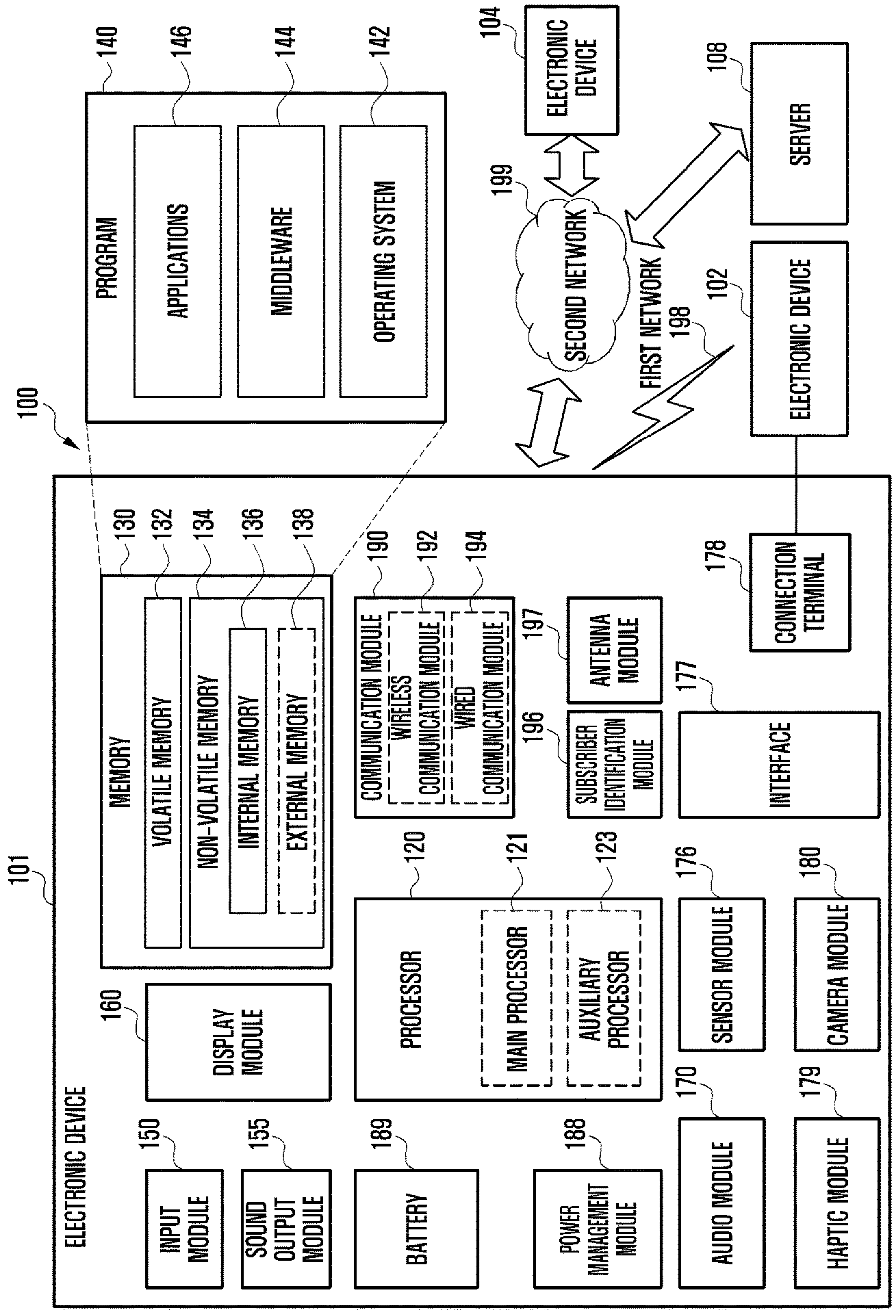
FIG. 1 is a block diagram of an electronic device according to an embodiment.

FIG. 1 is a block diagram illustrating an example electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
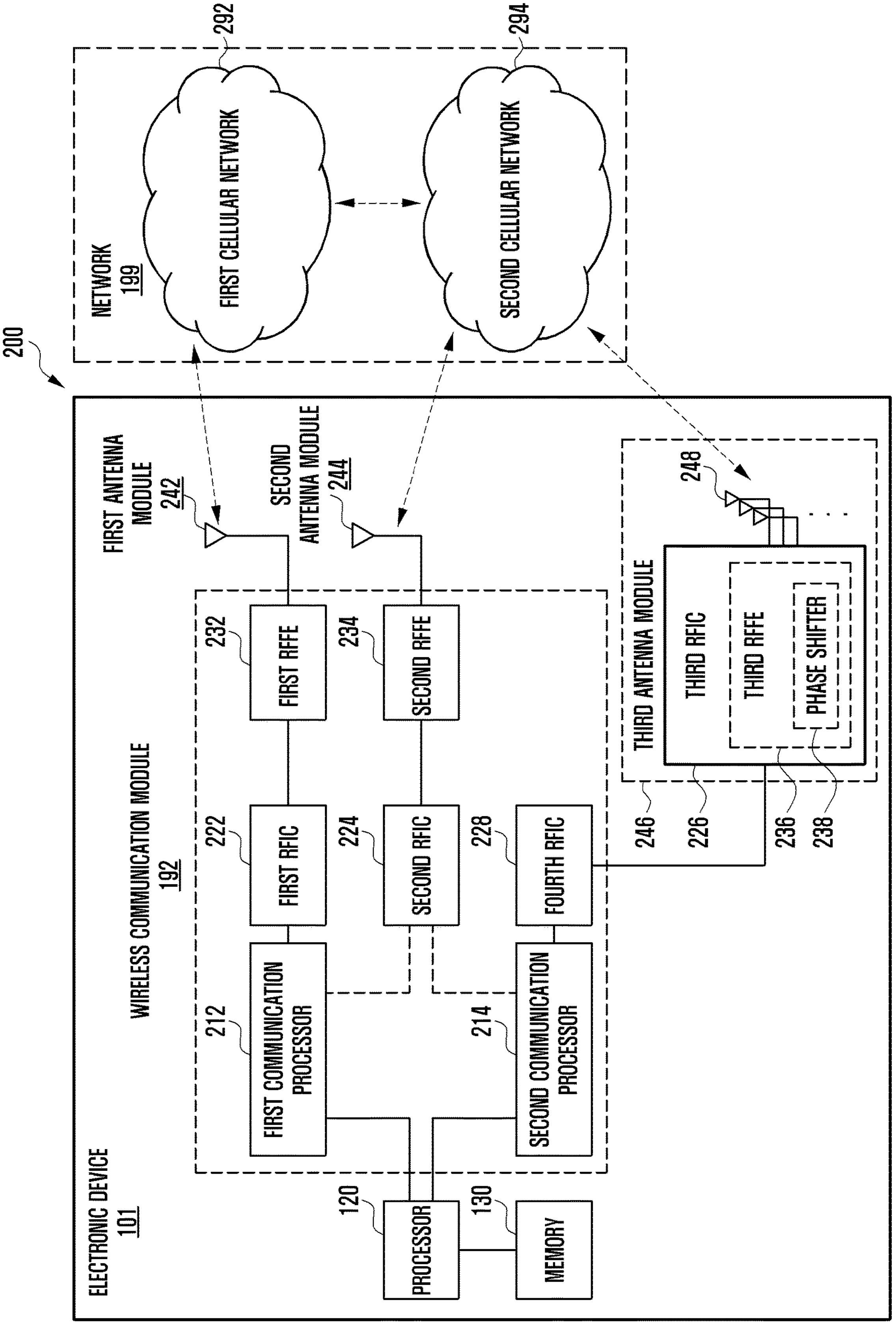
FIG. 2 is a block diagram of an electronic device to support legacy network communication and 5G network communication according to various embodiments.

FIG. 2 is a block diagram 200 of an electronic device 101 for supporting legacy network communication and 5G network communication according to certain embodiments. Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to an embodiment, the fourth RFIC 228 may be omitted or may be included as a part of the third RFIC 226.

The first communication processor 212 may include various processing circuitry (as used herein, including the claims, the term "processor", "communication processor", etc., may include various processing circuitry, including at least one processor, wherein one or more processors of the at least one processor may be configured to perform the various functions described herein) and establish a communication channel of a band to be used for wireless communication with the first network 292, and may support legacy network communication via the established communication channel. According to certain embodiments, the first network may be a legacy network including 2G, 3G, 4G, or long term evolution (LTE) network. The second communication processor 214 may include various processing circuitry and establish a communication channel corresponding to a designated band (e.g., approximately 6 GHz to 60 GHz) among bands to be used for wireless communication with the second network 294, and may support 5G network communication via the established channel. According to certain embodiments, the second network 294 may be a 5G network defined in 3GPP. Additionally, according to an embodiment, the first communication processor 212 or the second communication processor 214 may establish a communication channel corresponding to another designated band (e.g., lower than 6 GHz) among bands to be used for wireless communication with the second network 294, and may support 5G network communication via the established channel. According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the subprocessor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
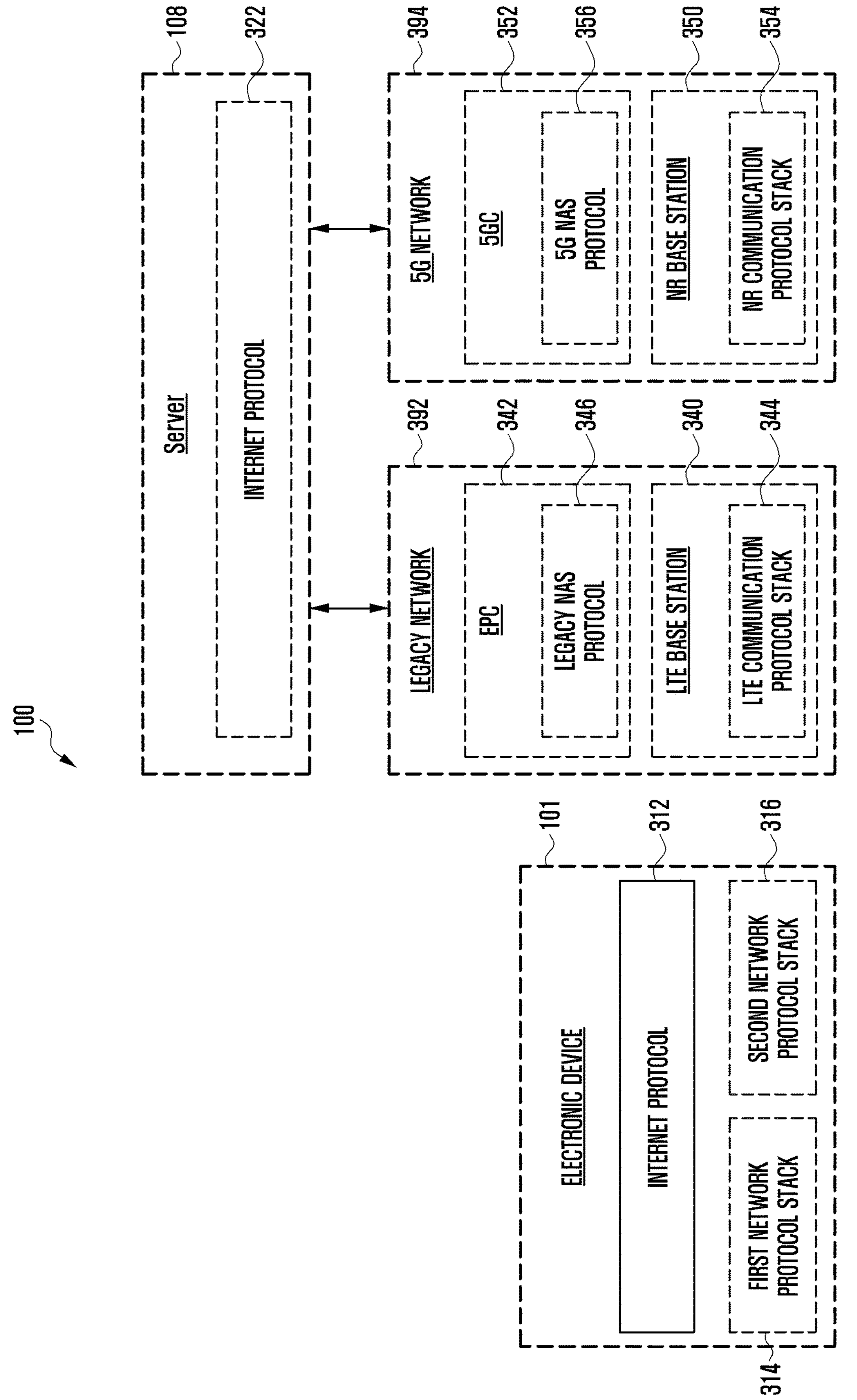
FIG. 3 is a diagram illustrating the protocol stack structure of a network 100 for legacy communication and/or 5G communication according to an embodiment.

FIG. 3 illustrates a protocol stack structure of the network 100 of legacy communication and/or 5G communication according to an embodiment.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Interne communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to an embodiment, the electronic device 101 may perform wireless communication with the legacy network 392 through the first communication protocol stack 314. According to an embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to an embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
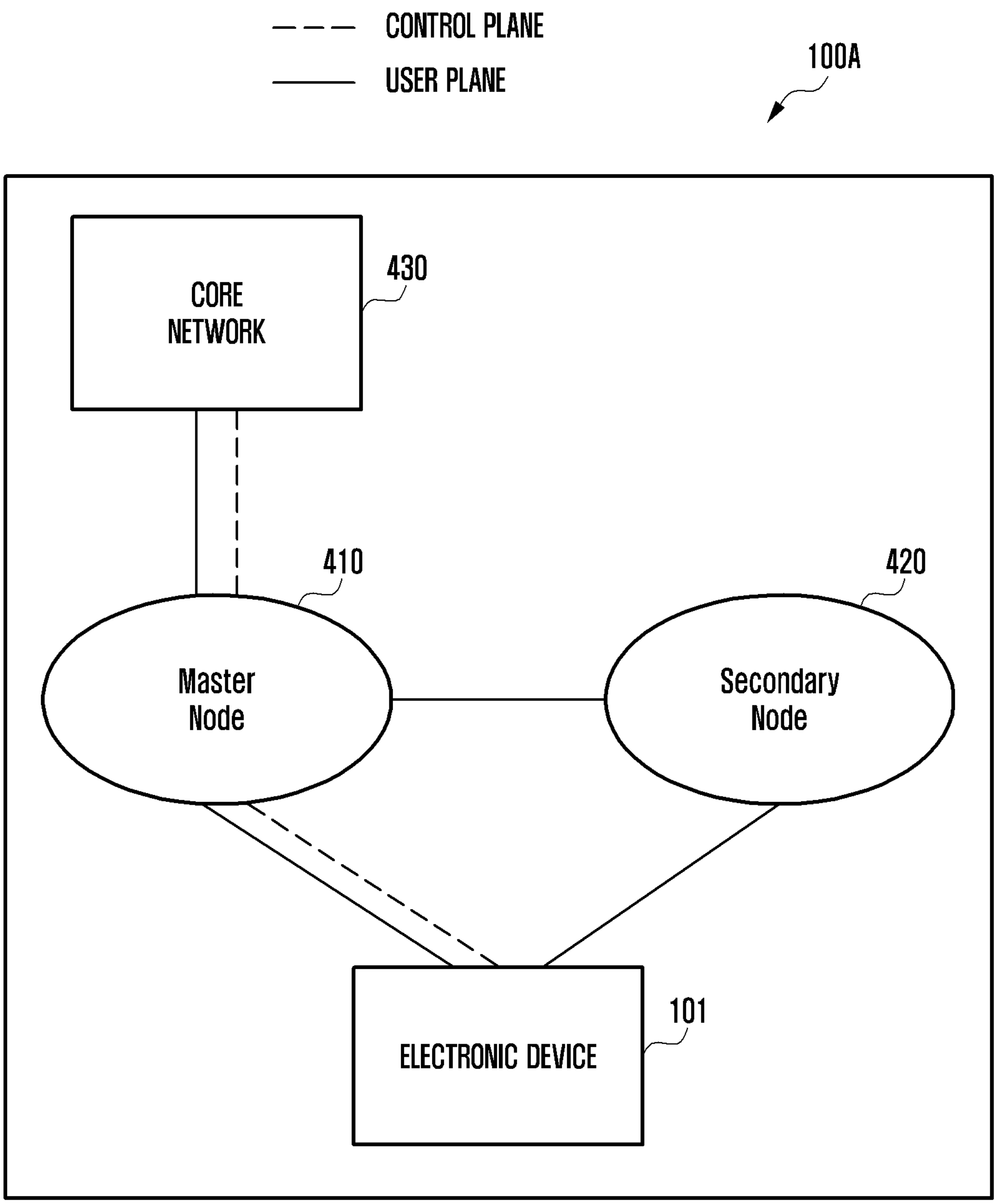
FIGS. 4A, 4B, and 4C are diagrams illustrating wireless communication systems that provide a network for legacy communication and/or 5G communication according to various embodiments.
Figure 4B:
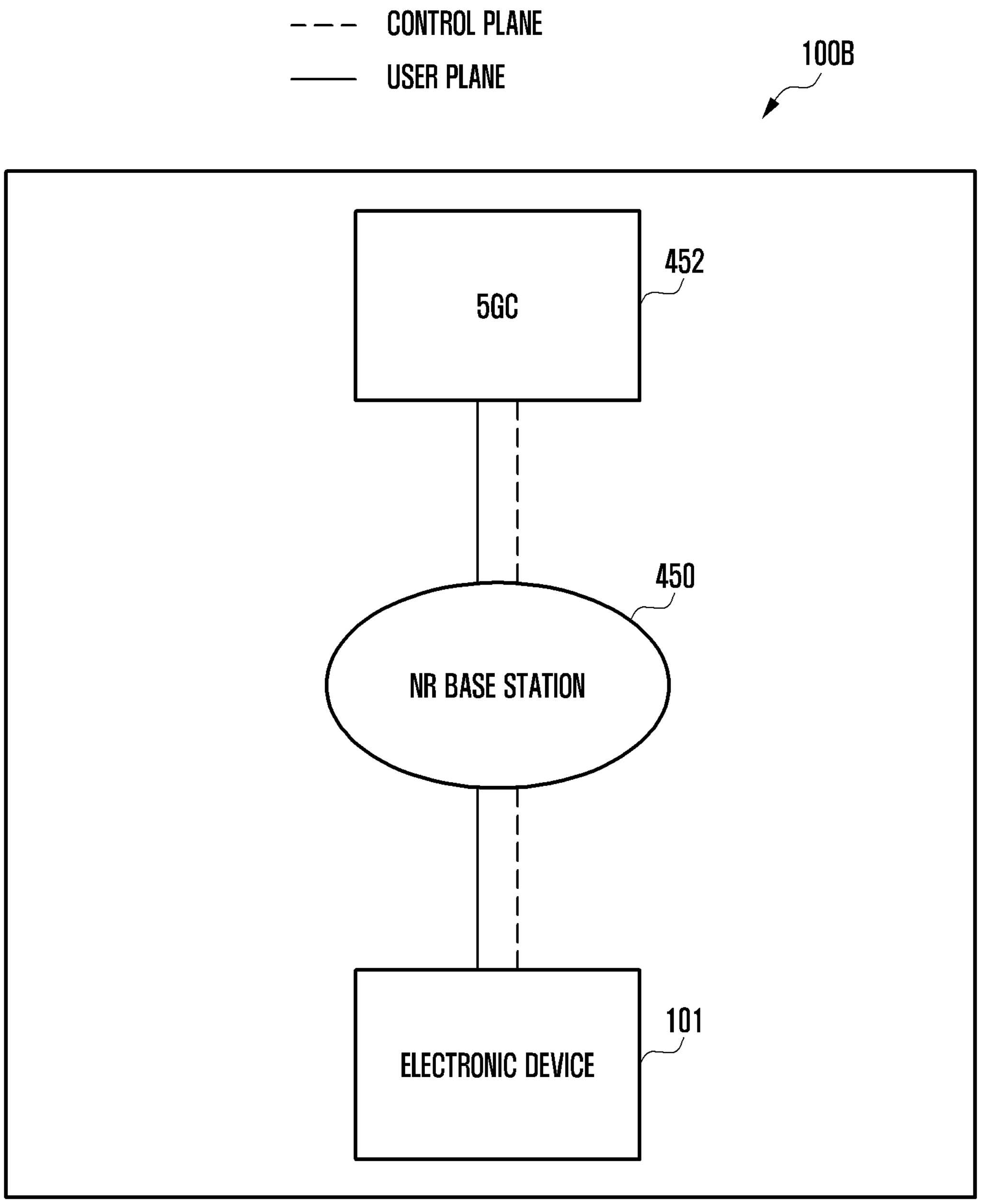
Figure 4C:
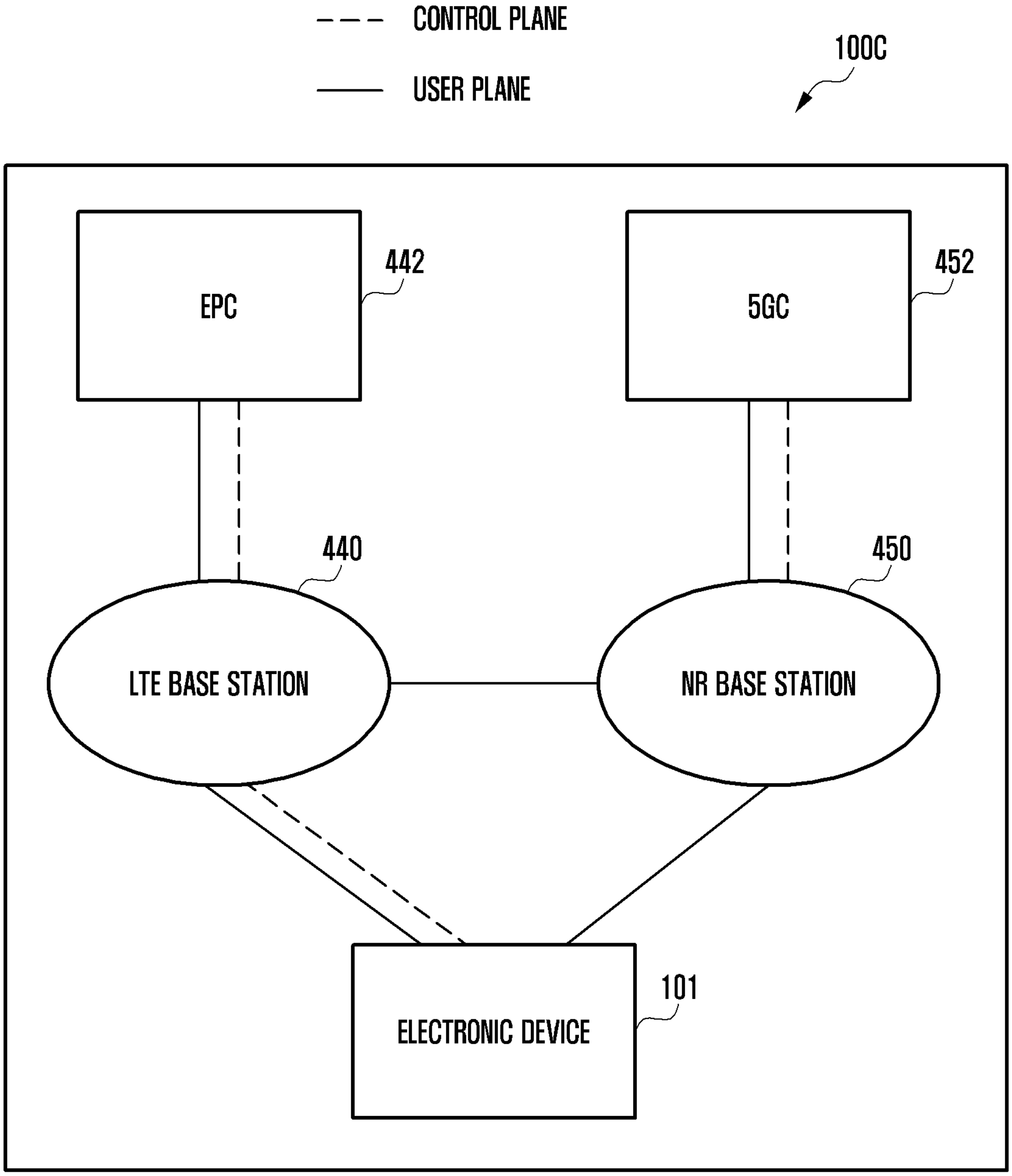

FIG. 4A illustrates a wireless communication system providing a network of legacy communication and/or 5G communication according to certain embodiments, FIG. 4B illustrates a wireless communication system providing a network of legacy communication and/or 5G communication according to certain embodiments, and FIG. 4C illustrates a wireless communication system providing a network of legacy communication and/or 5G communication according to certain embodiments. Referring to FIGS. 4A, 4B and 4C, network environments 100A, 100B and 100C may include at least one of a legacy network and a 5G network. The legacy network may include, for example, a 4G or LTE eNB 450 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a 5th generation core (5GC) 452 for managing 5G communication of th electronic device 101.

According to certain embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, the EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to certain embodiments, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to certain embodiments, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to certain embodiments, the MN 410 may include the LTE eNB 450, the SN 420 may include the NR gNB 450, and the core network 430 may include the EPC 442. For example, a control message may be transmitted and received through the LTE eNB 440 and the EPC 442, and user data may be transmitted and received through the LTE eNB 450 and the NR gNB 450.

Referring to FIG. 4B, according to certain embodiments, the 5G network may independently transmit and receive a control message and user data to and from the electronic device 101.

Referring to FIG. 4C, the legacy network and the 5G network according to certain embodiments may independently provide data transmission and reception. For example, the electronic device 101 and the EPC 442 may transmit and receive a control message and user data through the LTE eNB 450. According to an embodiment, the electronic device 101 and the 5GC 452 may transmit and receive a control message and user data through the NR gNB 450.

According to certain embodiments, the electronic device 101 may be registered in at least one of the EPC 442 or the 5GC 450 and transmit and receive a control message.

According to certain embodiments, the EPC 442 or the 5GC 452 may interwork and manage communication of the electronic device 101. For example, movement information of the electronic device 101 may be transmitted and received through an interface between the EPC 442 and the 5GC 452.

Figure 5:
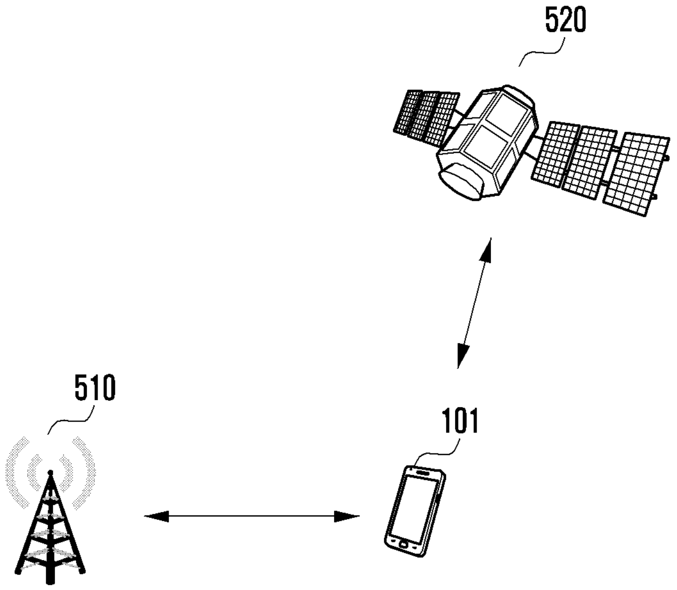
FIG. 5 is a diagram illustrating an electronic device and a cellular network according to an embodiment.

FIG. 5 is a diagram illustrating an electronic device and a cellular network according to an embodiment.

An electronic device (e.g., the electronic device 101 in FIG. 1) may transmit and/or receive data through a terrestrial network and/or a non-terrestrial network.

The terrestrial network may refer to a network capable of providing data communication through a first node (e.g., the NR base station 450 in FIG. 4B or LTE base station 440 in FIG. 4C) 510 fixed to the ground.

The non-terrestrial network may, for example, and without limitation, refer to a network capable of providing data communication through a satellite 520 that is not fixed to the ground.

The first node 510 may refer, for example, to a base station that supports first cellular communication or second cellular communication. The first cellular communication is any one of various cellular communication schemes supported by an electronic device (e.g., the electronic device 101 in FIG. 1) and may be, for example, a communication scheme on the second cellular network 294 in FIG. 2. For example, the first cellular communication may be a communication scheme using a 5th generation mobile communication scheme (e.g., new radio (NR)). The second cellular communication is any one of various cellular communication schemes supported by the electronic device 101, and may be, for example, a communication scheme on the first cellular network 292 in FIG. 2. For example, the second cellular communication may be a communication scheme using a 4th generation mobile communication scheme (e.g., long-term evolution (LTE)).

The first node 510 may transmit or receive signals in frequency bands supported by first cellular communication or second cellular communication. In the case where the electronic device 101 is connected to a terrestrial network through the first node 510, the electronic device 101 may perform data communication using a signal in the frequency band supported by the first node 510.

The satellite 520 may function as a base station supporting the first cellular communication or the second cellular communication. The satellite 520 may transmit or receive signals in frequency bands supported by the first cellular communication or the second cellular communication. In the case where the electronic device 101 is connected to a non-terrestrial network through the satellite 520, the electronic device 101 may perform data communication using signals in the frequency band supported by the satellite 520.

The electronic device 101 may be connected to the non-terrestrial network through the satellite 520, thereby performing various services.

The distance between the electronic device 101 and the satellite 520 may be greater than the distance between the electronic device 101 and the first node 510. If the electronic device 101 and the satellite 520 has a long distance therebetween, path loss on the data transmission or reception path between the electronic device 101 and the satellite may increase, and the time it takes for the electronic device 101 to transmit or receive data may increase. Furthermore, since the strength of a signal output from the electronic device 101 is limited, the transmission data rate of the electronic device 101 may be lowered. Therefore, communication services using the satellite 520 may be used within a limited scope. According to an example, a non-terrestrial network providing communication services using the satellite 520 may provide only specific services (e.g., a short messaging service (SMS) and a multimedia messaging service (MMS)) and may not provide other services (e.g., transmission and/or reception of user data).

The electronic device 101 may transmit a signal requesting a specific service (e.g., transmission of user data) (e.g., requesting establishment of a packet data unit (PDU) session for user data transmission) to a network through the satellite 520. If the network is unable to provide the specific service, a reject message may be transmitted to the electronic device 101 via the satellite 520 in response to the request signal. It may take a relatively long time for the electronic device 101 to receive the reject message due to the relatively long distance between the electronic device 101 and the satellite 520, and unnecessary power consumption and/or delay time may occur until the reject message is received.

Hereinafter, an embodiment in which the electronic device 101 prohibits (or refrains from) transmitting unnecessary signals and/or data to the non-terrestrial network, avoiding (or reducing) unnecessary resource consumption, will be described in greater detail with reference to the following figures.

Figure 6:
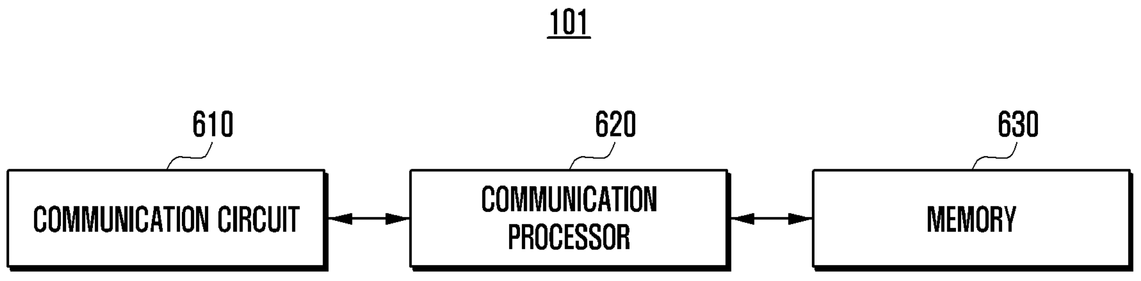
FIG. 6 is a block diagram of an electronic device according to an embodiment.

FIG. 6 is a block diagram of an electronic device according to an embodiment.

Referring to FIG. 6, an electronic device (e.g., the electronic device 101 in FIG. 1) according to various embodiments of the disclosure may include a communication circuit (e.g., the wireless communication module 192 in FIG. 1) 610, a communication processor (e.g., the processor 120 in FIG. 1 or the first communication processor 212 and/or the second communication processor 214 in FIG. 2) (e.g., including various processing circuitry) 620, and/or a memory (e.g., the memory 130 in FIG. 1) 630.

The communication circuit 610 may include, for example, a communication circuit that supports first cellular communication and/or second cellular communication, and may provide the electronic device 101 with communication with an external electronic device (e.g., the electronic device 104 in FIG. 1) through the first cellular communication and/or the second cellular communication. The first cellular communication is any one of various cellular communication schemes supported by the electronic device (e.g., the electronic device 101 in FIG. 1) and may be, for example, a communication scheme on the second cellular network 294 in FIG. 2. For example, the first cellular communication may be a communication scheme using a 5th generation mobile communication scheme (e.g., new radio (NR)). The second cellular communication is any one of various cellular communication schemes supported by the electronic device 101, and may be, for example, a communication scheme on the first cellular network 292 in FIG. 2. For example, the second cellular communication may be a communication scheme using a 4th generation mobile communication scheme (e.g., long-term evolution (LTE)).

The communication processor 620 may include various processing circuitry (as used herein, including the claims, the term "processor", "communication processor", etc., may include various processing circuitry, including at least one processor, wherein one or more processors of the at least one processor may be configured to perform the various functions described herein) and be operatively connected to the communication circuit 610. The communication processor 620 may control elements of the electronic device 101. For example, the communication processor 620 may control the elements of the electronic device 101 according to one or more instructions stored in the memory (e.g., the memory 130 in FIG. 1).

The communication processor 620 may control the communication circuit 610 to transmit and/or receive data through a terrestrial network and/or a non-terrestrial network.

The terrestrial network may refer to a network capable of providing data communication through a first node (e.g., the first node 510 in FIG. 5) fixed to the ground.

The non-terrestrial network may refer to a network capable of providing data communication through a node (e.g., the satellite 520 in FIG. 5) that is not fixed to the ground.

The communication processor 620 may control the communication circuit 610 to perform searching for a network for connection with the network. If the search for the network is successful, the communication processor 620 may perform a series of procedures to connect to the searched network.

The communication processor 620 may receive system information transmitted or broadcast by a node (e.g., the satellite 520 in FIG. 5) included in the network (e.g., the non-terrestrial network) while performing the network search.

The communication processor 620 may identify whether the searched network is a non-terrestrial network, based on the received system information.

The system information broadcast by node 520 may include a variety of information. According to an example, the system information may include SIB 1 defined in 3GPP TS. 36.331 v15.6. SIB 1 may include identification information (e.g., mobile country code (MCC) and public land mobile network (PLMN)) of the network including the node 520, information required to perform access (or random access (RA)) to the node 520, and/or information indicating that the network is a non-terrestrial network (e.g., cellBarredNTN information element (IE)).

If it is identified that the network identification information included in the system information transmitted or broadcast by the node 520 is specified identification information (e.g., identification information of a non-terrestrial network), the communication processor 620 may identify that the searched network is a non-terrestrial network. According to an example, MCC of a non-terrestrial network may start with 9. If it is identified that MCC of the network included in the system information transmitted or broadcast by the node 520 begins with 9, the communication processor 620 may identify that the searched network is a non-terrestrial network.

The communication processor 620 may identify that the searched network is a non-terrestrial network, based on information indicating that the network included in the system information transmitted or broadcast by the node 520 is a non-terrestrial network. According to an example, the communication processor 620 may identify that the searched network is a non-terrestrial network, based on identifying that the cellBarredNTN information element (IE) is indicated as not barred. The communication processor 620 may identify that the searched network is a terrestrial network, based on identifying that the cellBarredNTN information element (IE) is indicated as barred or that the cellBarredNTN IE is not included in the system information.

According to an example, the system information may include SIB 19 defined in 3GPP TS. 38.304. SIB 19 may include system information transmitted or broadcast when the network including the node 520 is a non-terrestrial network and may include information related to the non-terrestrial network (e.g., altitude information of the node 520 and movement speed information of the node 520). For example, the node transmitting or broadcasting SIB 19 may be a node included in the non-terrestrial network. If the system information transmitted or broadcast by the node 520 is SIB 19, the communication processor 620 may identify that the searched network is a non-terrestrial network.

The communication processor 620 may identify that the searched network is a non-terrestrial network and identify services supported (or services not supported) by the searched network, based on mapping data stored in the memory 630.

The mapping data may be data in which the identification information of the non-terrestrial network and information of services supported by the non-terrestrial network are mapped and stored. According to an example, the mapping data may be implemented as shown in Table 1 below and stored in the memory 630.

TABLE 1

| Network identification information (e.g., PLMN) | Whether SMS service is supported | Whether MMS service is supported | Whether transmitting and/or receiving user data is supported | Whether satellite PDU is supported |
|---|---|---|---|---|
| First Network (991-01) | Yes | No | No | No |

TABLE 1-continued

| Network identification information (e.g., PLMN) | Whether SMS service is supported | Whether MMS service is supported | Whether transmitting and/or receiving user data is supported | Whether satellite PDU is supported |
|---|---|---|---|---|
| Second Network (992-02) | Yes | Yes | No | No |
| Third Network (993-03) | Yes | Yes | Yes | No |
| Fourth Network (994-04) | Yes | Yes | No | Yes |

Referring to Table 1, the mapping data may be data obtained by mapping a specific network to whether services are supported. For example, the communication processor 620, based on the mapping data, may identify that the first network (991-01) supports the SMS service but does not support the MMS service, user data transmission and/or reception service, and satellite PDU service. For example, the communication processor 620, based on the mapping data, may identify that the second network (992-02) supports the SMS service and MMS service but does not support the user data transmission and/or reception service and satellite PDU service. For example, the communication processor 620, based on the mapping data, may identify that the third network (993-03) supports the SMS service, MMS service, and user data transmission and/or reception service but does not support the satellite PDU service. For example, the communication processor 620, based on the mapping data, may identify that the fourth network (994-04) supports the SMS service, MMS service, and satellite PDU service but does not support the user data transmission and/or reception service. The satellite PDU service is a service for transmitting and/or receiving user data using a PDU capable of being used only by the non-terrestrial network, and may refer to a service for transmitting and/or receiving user data using a PDU incapable of being accessed through the terrestrial network.

The communication processor 620 may not transmit a request message for establishing a PDU session for a service, which is not supported by the network, to the network. The communication processor 620 may prohibit a request message for establishing a PDU session for a service, which is not supported by the network, from being transmitted to the network. The communication processor 620 may not transmit, to the network, a request message for establishing a PDU session for a service, which is not supported by the network, thereby preventing and/or reducing unnecessary resource consumption due to transmission of a request message for establishing a PDU session.

According to an example, the communication processor 620 may be connected to the network through first cellular communication. The first cellular communication may support the transmission or reception of SMS through a non-access stratum (NAS), and thus the first cellular communication may not require establishment of a separate PDU session for the SMS service.

The communication processor 620 may identify, based on the mapping data, that the network connected through the first cellular communication supports only the SMS service (e.g., the first network) and may not transmit a signal requesting establishment of a separate PDU session to the node 520. Accordingly, the electronic device 101 may reduce unnecessary resource consumption or delay time caused by reception of a reject message that occurs when a signal requesting the establishment of a PDU session is transmitted to a network that does not support data transmission and/or reception through the PDU session.

According to an example, the communication processor 620 may be connected to the network through second cellular communication. The second cellular communication may require establishment of a PDU session for the transmission and reception of SMS.

The communication processor 620 may identify, based on the mapping data, that the network connected through the second cellular communication supports only the SMS service (e.g., the first network) and transmit a signal requesting establishment of a PDU session for the SMS service to the node 520. However, the communication processor 620 may not transmit, to the node 520, a signal requesting establishment of separate PDU sessions for services other than the SMS service. Accordingly, the electronic device 101 may reduce unnecessary resource consumption or delay time caused by reception of a reject message that occurs when a signal requesting the establishment of a PDU session is transmitted to a network that does not support data transmission and/or reception through the PDU session.

The communication processor 620 may identify, based on the mapping data, that the network connected through the first cellular communication or the second cellular communication supports the SMS service and the MMS service but does not support the transmission or reception of user data (e.g., the second network) and transmit a signal requesting establishment of a PDU session for the MMS service to the node 520. However, the communication processor 620 may not transmit, to the node 520, a signal requesting establishment of separate PDU sessions for services (e.g., the user data transmission or reception service) other than the MMS service. Accordingly, the electronic device 101 may reduce unnecessary resource consumption or delay time caused by reception of a reject message that occurs when a signal requesting the establishment of a PDU session is transmitted to a network that does not support the user data transmission and/or reception through the PDU session.

The communication processor 620 may identify, based on the mapping data, that the network connected through the first cellular communication or the second cellular communication supports the SMS service, MMS service, and transmission or reception of user data (e.g., the third network) and transmit, to the node 520, a signal requesting establishment of a PDU session for the MMS service and/or a signal requesting establishment of a PDU session for the user data transmission or reception service. The communication processor 620 may perform a series of procedures for establishing a PDU session for the user data transmission or reception service after transmitting the signal requesting the establishment of a PDU session for the user data transmission or reception service. The communication processor 620 may transmit data to the network or receive data from the network through the PDU session for the user data transmission or reception service.

However, the communication processor 620 may receive, from an application processor (e.g., the processor 120 in FIG. 1), a signal requesting to prohibit transmission and/or reception of user data by applications other than a specified application. The application processor 120 may specify in advance an application capable of performing the data transmission or reception through a non-terrestrial network, and the application processor 120 may prohibit applications other than the specified application from transmitting or receiving user data. According to an example, the application processor 120 may not transmit user data generated by applications other than the specified application to the communication processor 620. Alternatively, even if the application processor 120 transmits user data generated by applications other than the specified application to the communication processor 620, the application processor 120 may control the communication processor 620 to not transmit the user data through a PDU session for the user data transmission or reception service.

The communication processor 620 may identify, based on the mapping data, that the network connected through the first cellular communication or the second cellular communication supports the SMS service, MMS service, and transmission or reception of user data through a satellite PDU (e.g., the fourth network) and transmit a signal requesting establishment of a satellite PDU session to the node 520. The communication processor 620 may prohibit transmission of a signal requesting the establishment of a PDU session for transmitting or receiving user data. The communication processor 620 may transmit a signal requesting the establishment of a satellite PDU session and then perform a series of procedures for establishing the satellite PDU session. The communication processor 620 may transmit data to the network or receive data from the network through the satellite PDU session.

However, the communication processor 620 may receive, from the application processor (e.g., the processor 120 in FIG. 1), a signal requesting to prohibit transmission and/or reception of user data by applications other than the specified application. The application processor 120 may pre-specify an application capable of performing data transmission or reception through a non-terrestrial network, and the application processor 120 may prohibit applications other than the specified application from transmitting or receiving user data. According to an example, the application processor 120 may not transmit user data generated by applications other than the specified application to the communication processor 620. Alternatively, even if the application processor 120 transmits user data generated by applications other than the specified application to the communication processor 620, the application processor 120 may control the communication processor 620 to not transmit the user data through a satellite PDU session.

As described above, the electronic device 101 may not transmit a message requesting the establishment of a PDU session for a service, which is not supported by the non-terrestrial network, to the node 520, thereby reducing unnecessary consumption of resources or delay time caused by reception of a reject message that occurs when a signal requesting the establishment of a PDU session for a service, which is not supported by the non-terrestrial network, is transmitted.

In addition to prohibiting the establishment of a PDU session, the electronic device 101 may reduce the size of data included in the signal to be transmitted to the non-terrestrial network, thereby reducing delay time that occurs when the node 520 and the electronic device 101 have a long distance therebetween.

The communication processor 620 may receive a UE capability request message from the network during a registration process in the network or after the registration of the network.

After an RRC connection is established with the electronic device 101, the network may transmit a UE capability request message to the electronic device 101 when UE capability information is required. The UE capability information may refer to information indicating the performance of the electronic device 101 in relation to cellular communication of the electronic device 101. For example, the UE capability information may include information indicating a frequency band capable of being supported by the electronic device 101 or information indicating a combination of frequency bands capable of being supported by the electronic device 101. The combination of frequency bands capable of being supported by the electronic device 101 may refer to a combination of frequency bands in which the electronic device 101 is able to perform simultaneous transmission or reception of data. For example, if the electronic device 101 may simultaneously perform both transmission (or reception) of a signal through a first frequency band and transmission (or reception) of a signal through a second frequency band, the combination of frequency bands capable of being supported by the electronic device 101 may be the first frequency band and the second frequency band.

Upon receiving the UE capability request message from the network, the communication processor 620 may transmit UE capability information to the network through the node 520.

When transmitting the UE capability information, the communication processor 620 may transmit UE capability information excluding information that is not related to the network (or not including information that is not related to the network) to the network.

According to an example, in the case where the network is a non-terrestrial network, the network may not support communication schemes (e.g., carrier aggregation (CA), E-UTRA-NR dual connectivity (EN-DC), or multi-RAT dual connectivity (MR-DC)) that support transmission or reception of data through a plurality of frequency bands. If the network does not support transmission or reception of data through a plurality of frequency bands, the combination of frequency bands capable of being supported by the electronic device 101 may be unnecessary information for the network. Accordingly, the communication processor 620 may transmit UE capability information that does not include information indicating a combination of frequency bands supported by the electronic device 101 to the network, thereby reducing the time (or delay time) for transmission of the UE capability information.

According to an example, in the case where the network is a non-terrestrial network, the network may not support communication schemes (e.g., carrier aggregation (CA), E-UTRA-NR dual connectivity (EN-DC), or multi-RAT dual connectivity (MR-DC)) that support transmission or reception of data through a plurality of frequency bands. If the network does not support transmission or reception of data through a plurality of frequency bands, information indicating whether the electronic device 101 supports different generations of cellular communication schemes may be unnecessary information for the network. Accordingly, the communication processor 620 may transmit UE capability information that does not include information indicating whether the electronic device 101 supports different generations of cellular communication schemes to the network, thereby reducing the time (or delay time) for transmission of the UE capability information.

According to an example, in the case where the network is a non-terrestrial network, the network may not support communication schemes (e.g., MIMO (multi-input and multi-output)) that support transmission or reception of data using a plurality of antennas. If the network does not support transmission or reception of data through a plurality of frequency bands, information indicating whether the electronic device 101 supports communication schemes supporting the transmission or reception of data using a plurality of antennas may be unnecessary information for the network. Accordingly, the communication processor 620 may transmit UE capability information that does not include information indicating whether the electronic device 101 supports communication schemes supporting the transmission or reception of data using a plurality of antennas to the network, thereby reducing the time (or delay time) for transmission of the UE capability information.

In addition to the examples described above, the communication processor 620 may reduce the time (or delay time) for transmission of UE capability information by transmitting, to the network, UE capability information excluding information that is not related to the network.

According to an example, in the case where the network is a non-terrestrial network, the network may not support various configurations (e.g., conditional handover) of a specific frequency band (e.g., a specific frequency band (e.g., FR2-1 (24250 MHz to 52600 MHz) or FR2-2 (52600 MHz to 71000 MHz)) supporting time duplex divisional (TDD)). If the network does not support various configurations of a specific frequency band, information indicating whether the electronic device 101 supports various configurations of a specific frequency band may be unnecessary information for the network. Accordingly, the communication processor 620 may transmit UE capability information that does not include information indicating whether the electronic device 101 supports various configurations of a specific frequency band to the network, thereby reducing the time (or delay time) for transmission of the UE capability information.

The communication processor 620 may transmit, to the network, UE capability information excluding information that is not related to the network but including information that is related to the network, thereby reducing the time (or delay time) for transmission of the UE capability information.

According to an example, in the case where the network is a non-terrestrial network, the network may support a specific frequency band (e.g., FR1 (410 MHz to 7125 MHz) band supporting frequency divisional duplex (FDD)). If the network supports various configurations of a specific frequency band, information indicating whether the electronic device 101 supports various configurations of a specific frequency band may be necessary information for the network. Accordingly, the communication processor 620 may transmit UE capability information that includes information indicating whether the electronic device 101 supports various configurations of a specific frequency band to the network, thereby reducing the time (or delay time) for transmission of the UE capability information.

According to an example, the communication processor 620 may transmit, to the network, UE capability information including information expected to be required by the network. According to an example, if the electronic device 101 supports parallel measurement to measure the quality of signals in a plurality of frequency bands, the communication processor 620 may also transmit UE capability information including information related to the parallel measurement to the network.

The communication processor 620 may determine whether to perform a specified service, based on system information broadcast by a connected network (or node 520).

According to an example, the system information may include SIB 19 defined in 3GPP TS. 38.304. SIB 19 may include system information transmitted or broadcast when the network including the node 520 is a non-terrestrial network and may include information related to the non-terrestrial network (e.g., altitude information of the node 520 or movement speed information of the node 520). For example, the node transmitting or broadcasting SIB 19 may be a node included in the non-terrestrial network.

The communication processor 620 may identify altitude information of the node 520 included in the system information transmitted or broadcast by the node 520 and determine whether to perform a specified service, based on whether the altitude of the node 520 is greater than or equal to a specified value (e.g., threshold).

The altitude information of the node 520 may include a field value included in the field of semiMajorAxis of EphemerisInfo IE of NTN-config, which is included in SIB 19. The communication processor 620 may determine the altitude of the node 520 using the field value and the method defined in TS 38.331 (e.g., Equation 1).

$$\text{Altitude of node} = 6500000 + (\text{field value}) * \left(4.249 * 10^{-3}\right) \quad \text{[Equation 1]}$$

The specified service may be a service that requires a low delay time. For example, the specified service may include voice calls or video calls. When the electronic device 101 performs a service requiring a low delay time, as the distance between the electronic device 101 and the node 520 increases, the quality of service may deteriorate or the service may not be performed. Accordingly, if the altitude of the node 520 is equal to or greater than (or exceeds) the specified value (threshold), the communication processor 620 may not perform the specified service or may stop performing the specified service. The specified value is a value related to the specified service and may be a value related to the maximum altitude of the node 520 capable of performing the specified service. The specified value may be a value pre-stored in the memory 630 or may be a value related to the altitude of the node 520.

If the altitude of the node 520 is equal to or less than (or below) the specified value (threshold), the communication processor 620 may perform the specified service or continue to perform the specified service.

While performing the specified service, the communication processor 620 may encode data related to the specified service using a codec that supports the lowest data rate. The communication processor 620 may reduce the size of data using a codec that supports the lowest data rate, thereby reducing the time (or delay time) required to transmit encoded data.

Figure 7:
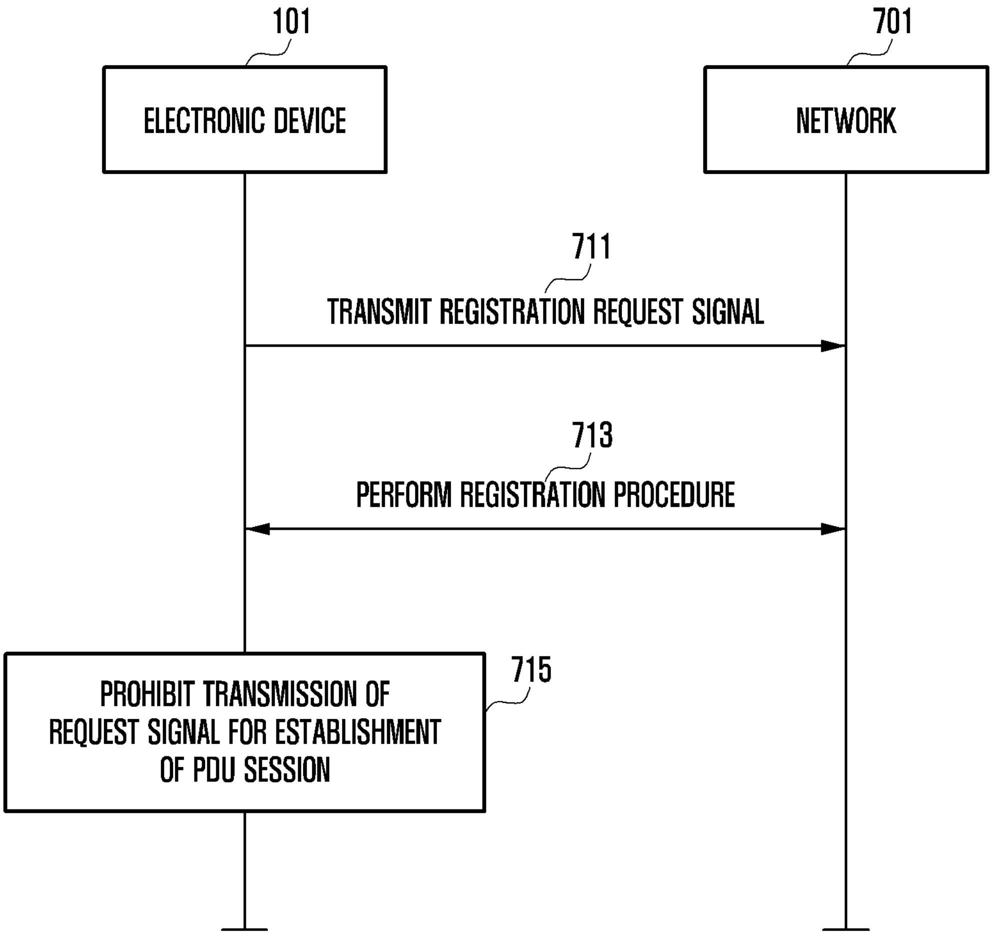
FIG. 7 is a diagram illustrating an embodiment in which an electronic device prohibits a request signal for establishing a PDU session according to an embodiment.

FIG. 7 is a diagram illustrating an embodiment in which an electronic device prohibits a request signal for establishing a PDU session according to an embodiment.

An electronic device (e.g., the electronic device 101 in FIG. 6) may transmit a registration request signal to a network 701 in operation 711.

The electronic device 101 may control the communication circuit 610 to search for the network 701 for connection to the network 701. If searching for the network 701 is successful, the electronic device 101 may perform a series of procedures to connect to the searched network 701.

The electronic device 101 may receive system information transmitted or broadcast by a node (e.g., the satellite 520 in FIG. 5) included in the network 701 (e.g., a non-terrestrial network) while performing searching for the network 701.

The electronic device 101 may identify whether the searched network 701 is a non-terrestrial network, based on the received system information.

The system information broadcast by the node 520 may include a variety of information. According to an example, the system information may include SIB 1 defined in 3GPP TS. 36.331 v15.6. SIB 1 may include identification information (e.g., mobile country code (MCC) and public land mobile network (PLMN)) of the network 701 including the node 520, information required to perform access (or random access (RA)) to the node 520, and/or information indicating that the network 701 is a non-terrestrial network (e.g., cellBarredNTN information element (IE)).

If it is identified that the identification information of the network 701 included in the system information transmitted or broadcast by the node 520 is specified identification information (e.g., identification information of a non-terrestrial network), the electronic device 101 may identify that the searched network 701 is a non-terrestrial network.

The electronic device 101 may identify that the searched network 701 is a non-terrestrial network, based on information indicating that the network 701 included in the system information transmitted or broadcast by the node 520 is a non-terrestrial network. According to an example, the electronic device 101 may identify that the searched network 701 is a non-terrestrial network, based on identifying that the cellBarredNTN information element (IE) is indicated as not barred. The electronic device 101 may identify that the searched network 701 is a terrestrial network, based on identifying that the cellBarredNTN information element (IE) is indicated as barred or that the cellBarredNTN IE is not included in the system information.

According to an example, the system information may include SIB 19 defined in 3GPP TS. 38.304. SIB 19 may include system information transmitted or broadcast when the network 701 including the node 520 is a non-terrestrial network and may include information related to the non-terrestrial network (e.g., altitude information of the node 520 and movement speed information of the node 520). For example, the node transmitting or broadcasting SIB 19 may be a node included in the non-terrestrial network. If the system information transmitted or broadcast by the node 520 is SIB 19, the electronic device 101 may identify that the searched network 701 is a non-terrestrial network.

The electronic device 101 may identify that the searched network 701 is a non-terrestrial network and identify services supported (or services not supported) by the searched network 701, based on mapping data stored in the memory 630.

The mapping data may be data in which the identification information of the non-terrestrial network and information of services supported by the non-terrestrial network are mapped and stored.

The electronic device 101 and the network 701 may perform a registration procedure for the electronic device 101 in operation 713.

The electronic device 101 may complete registration with respect to the network 701 through a series of operations including initial access to the node 520 included in the searched network 701 and an authentication procedure of the electronic device 101. As the registration with the network 701 is completed, the electronic device 101 may perform services provided by the network 701.

In operation 715, the electronic device 101 may prohibit transmission of a request signal for establishment of a PDU session.

The electronic device 101 may not transmit, to the network 701, a request message for establishment of a PDU session for a service that is not supported by the network 701. The electronic device 101 may prohibit (or refrain from) transmitting, to the network 701, a request message for establishment of a PDU session for a service that is not supported by the network 701. The electronic device 101 may not transmit a request message for the establishment of a PDU session for a service, which is not supported by the network 701, to the network 701, thereby reducing unnecessary consumption of resources due to transmission of a request message for establishing a PDU session.

According to an example, the electronic device 101 may be connected to the network 701 through first cellular communication. The first cellular communication may support the transmission or reception of SMS through a non-access stratum (NAS), and thus the first cellular communication may not require establishment of a separate PDU session for the SMS service.

The electronic device 101 may identify, based on the mapping data, that the network 701 connected through the first cellular communication supports only the SMS service (e.g., the first network 701) and may not transmit a signal requesting establishment of a separate PDU session to the node 520. Accordingly, the electronic device 101 may reduce unnecessary resource consumption or delay time caused by reception of a reject message that occurs when a signal requesting the establishment of a PDU session is transmitted to the network 701 that does not support transmission and/or reception of data through the PDU session.

Figure 8:
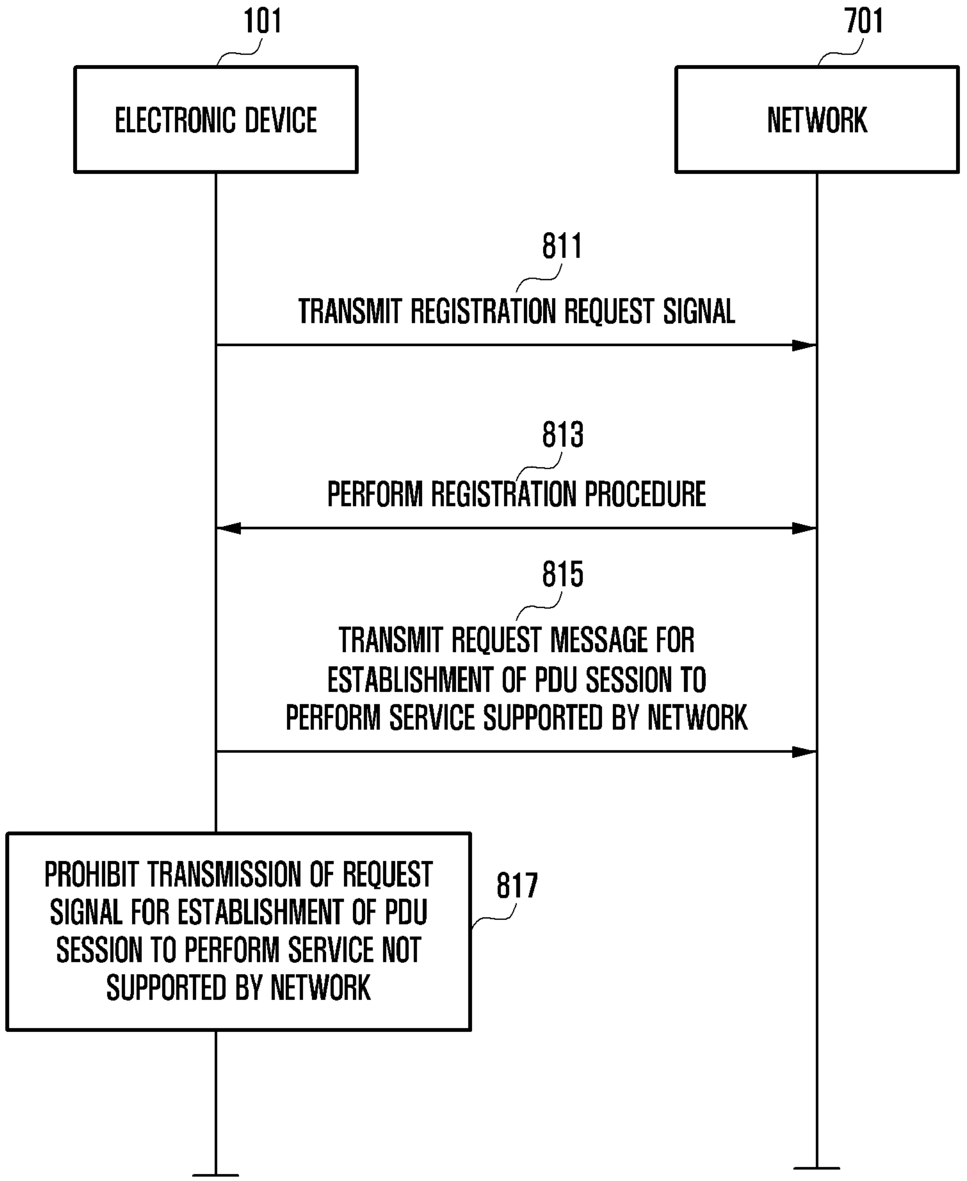
FIG. 8 is a diagram illustrating an embodiment in which an electronic device prohibits a request signal for establishment of a PDU session for a service that is not supported by a network according to an embodiment.

FIG. 8 is a diagram illustrating an embodiment in which an electronic device prohibits a request signal for establishment of a PDU session for a service that is not supported by a network according to an embodiment.

An electronic device (e.g., the electronic device 101 in FIG. 6) may transmit a registration request signal to a network 701 in operation 811.

The electronic device 101 may control the communication circuit 610 to search for the network 701 for connection to the network 701. If searching for the network 701 is successful, the electronic device 101 may perform a series of procedures to connect to the searched network 701.

The electronic device 101 may receive system information transmitted or broadcast by a node (e.g., the satellite 520 in FIG. 5) included in the network 701 (e.g., a non-terrestrial network) while performing searching for the network 701.

The electronic device 101 may identify whether the searched network 701 is a non-terrestrial network, based on the received system information.

The system information broadcast by the node 520 may include a variety of information. According to an example, the system information may include SIB 1 defined in 3GPP TS. 36.331 v15.6. SIB 1 may include identification information (e.g., mobile country code (MCC) and public land mobile network (PLMN)) of the network 701 including the node 520, information required to performing access (or random access (RA)) to the node 520, and/or information indicating that the network 701 is a non-terrestrial network (e.g., cellBarredNTN information element (IE)).

If it is identified that the identification information of the network 701 included in the system information transmitted or broadcast by the node 520 is specified identification information (e.g., identification information of a non-terrestrial network), the electronic device 101 may identify that the searched network 701 is a non-terrestrial network.

The electronic device 101 may identify that the searched network 701 is a non-terrestrial network, based on information indicating that the network 701 included in the system information transmitted or broadcast by the node 520 is a non-terrestrial network. According to an example, the electronic device 101 may identify that the searched network 701 is a non-terrestrial network, based on identifying that the cellBarredNTN information element (IE) is indicated as not barred. The electronic device 101 may identify that the searched network 701 is a terrestrial network, based on identifying that the cellBarredNTN information element (IE) is indicated as barred or that the cellBarredNTN IE is not included in the system information.

According to an example, the system information may include SIB 19 defined in 3GPP TS. 38.304. SIB 19 may include system information transmitted or broadcast when the network 701 including the node 520 is a non-terrestrial network and may include information related to the non-terrestrial network (e.g., altitude information of the node 520 and movement speed information of the node 520). For example, the node transmitting or broadcasting SIB 19 may be a node included in the non-terrestrial network. If the system information transmitted or broadcast by the node 520 is SIB 19, the electronic device 101 may identify that the searched network 701 is a non-terrestrial network.

The electronic device 101 may identify that the searched network 701 is a non-terrestrial network and identify services supported (or services not supported) by the searched network 701, based on mapping data stored in the memory 630.

The mapping data may be data in which the identification information of the non-terrestrial network and information of services supported by the non-terrestrial network are mapped and stored.

The electronic device 101 and the network 701 may perform a registration procedure for the electronic device 101 in operation 813.

The electronic device 101 may complete registration with respect to the network 701 through a series of operations including initial access to the node 520 included in the searched network 701 and an authentication procedure of the electronic device 101. As the registration with the network 701 is completed, the electronic device 101 may perform services provided by the network 701.

In operation 815, the electronic device 101 may transmit, to the network 701, a request message for establishment of a PDU session to perform services supported by the network.

The electronic device 101 may identify, based on the mapping data, that the network 701 connected through the first cellular communication or the second cellular communication supports the SMS service, MMS service, and transmission or reception of user data (e.g., the third network 701) and transmit, to the node 520, a signal requesting establishment of a PDU session for the MMS service and/or a signal requesting establishment of a PDU session for the user data transmission or reception service. The electronic device 101 may perform a series of procedures for establishing a PDU session for the user data transmission or reception service after transmitting the signal requesting the establishment of a PDU session for the user data transmission or reception service. The electronic device 101 may transmit data to the network 701 or receive data from the network 701 through the PDU session for the user data transmission or reception service.

However, the electronic device 101 may receive, from an application processor (e.g., the processor 120 in FIG. 1), a signal requesting to prohibit transmission and/or reception of user data by applications other than a specified application. The application processor 120 may pre-specify an application capable of performing the data transmission or reception through a non-terrestrial network, and the application processor 120 may prohibit applications other than the specified application from transmitting or receiving user data. According to an example, the application processor 120 may not transmit user data generated by applications other than the specified application to the electronic device 101. Even if the application processor 120 transmits user data generated by applications other than the specified application to the electronic device 101, the application processor 120 may control the electronic device 101 to not transmit the user data through the PDU session for the user data transmission or reception service.

In operation 817, the electronic device 101 may prohibit (or refrain from) transmitting a request signal for establishment of a PDU session to perform services that are not supported by the network.

The electronic device 101 may identify, based on the mapping data, that the network 701 connected through the first cellular communication or the second cellular communication supports the SMS service and the MMS service but does not support the transmission or reception of user data (e.g., the second network 701) and transmit a signal requesting establishment of a PDU session for the MMS service to the node 520. However, the electronic device 101 may not transmit, to the node 520, a signal requesting establishment of separate PDU sessions for services (e.g., the user data transmission or reception service) other than the MMS service. Accordingly, the electronic device 101 may reduce unnecessary resource consumption or delay time caused by reception of a reject message that occurs when a signal requesting the establishment of a PDU session is transmitted to the network 701 that does not support the user data transmission and/or reception through the PDU session.

Figure 9:
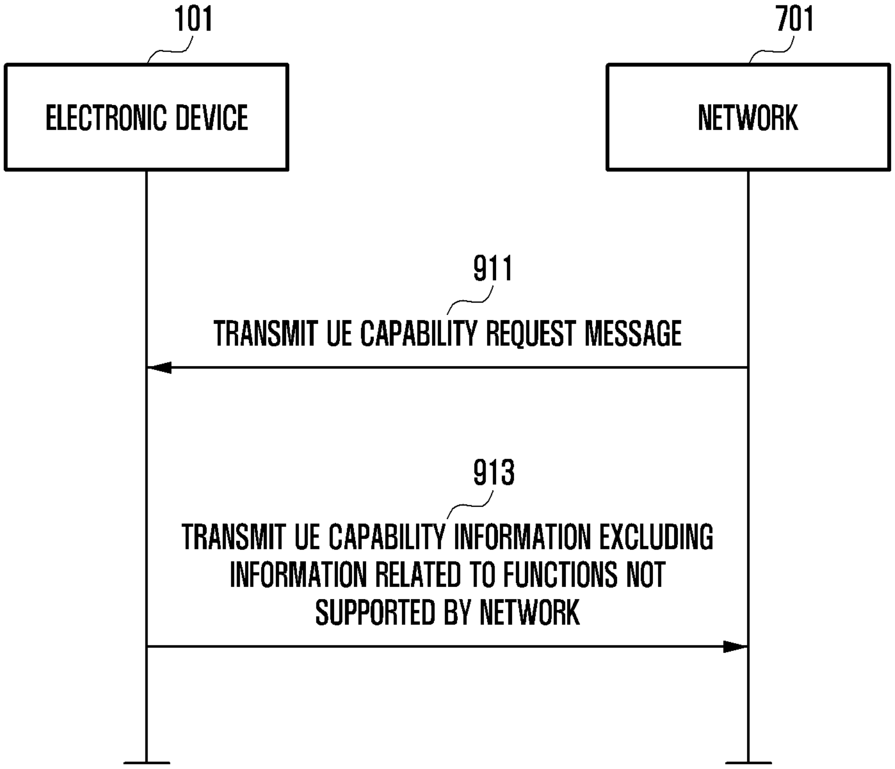
FIG. 9 is a diagram illustrating an embodiment in which an electronic device transmits UE capability information excluding information related to functions that are not supported by a network according to an embodiment.

FIG. 9 is a diagram illustrating an embodiment in which an electronic device transmits UE capability information excluding information related to functions that are not supported by a network according to an embodiment.

The network 701 may transmit a UE capability request message to the electronic device (e.g., the electronic device 101 in FIG. 6) in operation 911.

The electronic device 101 may receive the UE capability request message from the network 701 during a registration process in the network 701 or after being registered in the network 701.

After an RRC connection is established with the electronic device 101, the network 701 may transmit a UE capability request message to the electronic device 101 when UE capability information is required. The UE capability information may refer to information indicating the performance of the electronic device 101 in relation to cellular communication of the electronic device 101. For example, the UE capability information may include information indicating a frequency band capable of being supported by the electronic device 101 or information indicating a combination of frequency bands capable of being supported by the electronic device 101. The combination of frequency bands capable of being supported by the electronic device 101 may refer to a combination of frequency bands in which the electronic device 101 is able to perform simultaneous transmission or reception of data. For example, if the electronic device 101 may simultaneously perform both transmission (or reception) of a signal through a first frequency band and transmission (or reception) of a signal through a second frequency band, the combination of frequency bands capable of being supported by the electronic device 101 may be the first frequency band and the second frequency band.

In operation 913, the electronic device 101 may transmit UE capability information excluding information related to functions, which are not supported by the network 701, to the network 701.

Upon receiving the UE capability request message from the network 701, the electronic device 101 may transmit UE capability information to the network 701 through the node 520.

When transmitting the UE capability information, the electronic device 101 may transmit UE capability information excluding information that is not related to the network 701 (or not including information that is not related to the network 701) to the network 701.

According to an example, in the case where the network 701 is a non-terrestrial network, the network 701 may not support communication schemes (e.g., carrier aggregation (CA), E-UTRA-NR dual connectivity (EN-DC), or multi-RAT dual connectivity (MR-DC)) that support transmission or reception of data through a plurality of frequency bands. If the network 701 does not support transmission or reception of data through a plurality of frequency bands, the combination of frequency bands capable of being supported by the electronic device 101 may be unnecessary information for the network 701. Accordingly, the electronic device 101 may transmit UE capability information that does not include information indicating a combination of frequency bands supported by the electronic device 101 to the network 701, thereby reducing the time (or delay time) for transmission of the UE capability information.

According to an example, in the case where the network 701 is a non-terrestrial network, the network 701 may not support communication schemes (e.g., carrier aggregation (CA), E-UTRA-NR dual connectivity (EN-DC), or multi-RAT dual connectivity (MR-DC)) that support transmission or reception of data through a plurality of frequency bands. If the network 701 does not support transmission or reception of data through a plurality of frequency bands, information indicating whether the electronic device 101 supports different generations of cellular communication schemes may be unnecessary information for the network 701. Accordingly, the electronic device 101 may transmit UE capability information that does not include information indicating whether the electronic device 101 supports different generations of cellular communication schemes to the network 701, thereby reducing the time (or delay time) for transmission of the UE capability information.

According to an example, in the case where the network 701 is a non-terrestrial network, the network 701 may not support communication schemes (e.g., MIMO (multi-input and multi-output)) that support transmission or reception of data using a plurality of antennas. If the network 701 does not support transmission or reception of data through a plurality of frequency bands, information indicating whether the electronic device 101 supports communication schemes supporting the transmission or reception of data using a plurality of antennas may be unnecessary information for the network 701. Accordingly, the electronic device 101 may transmit UE capability information that does not include information indicating whether the electronic device 101 supports communication schemes supporting the transmission or reception of data using a plurality of antennas to the network 701, thereby reducing the time (or delay time) for transmission of the UE capability information.

Figure 10:
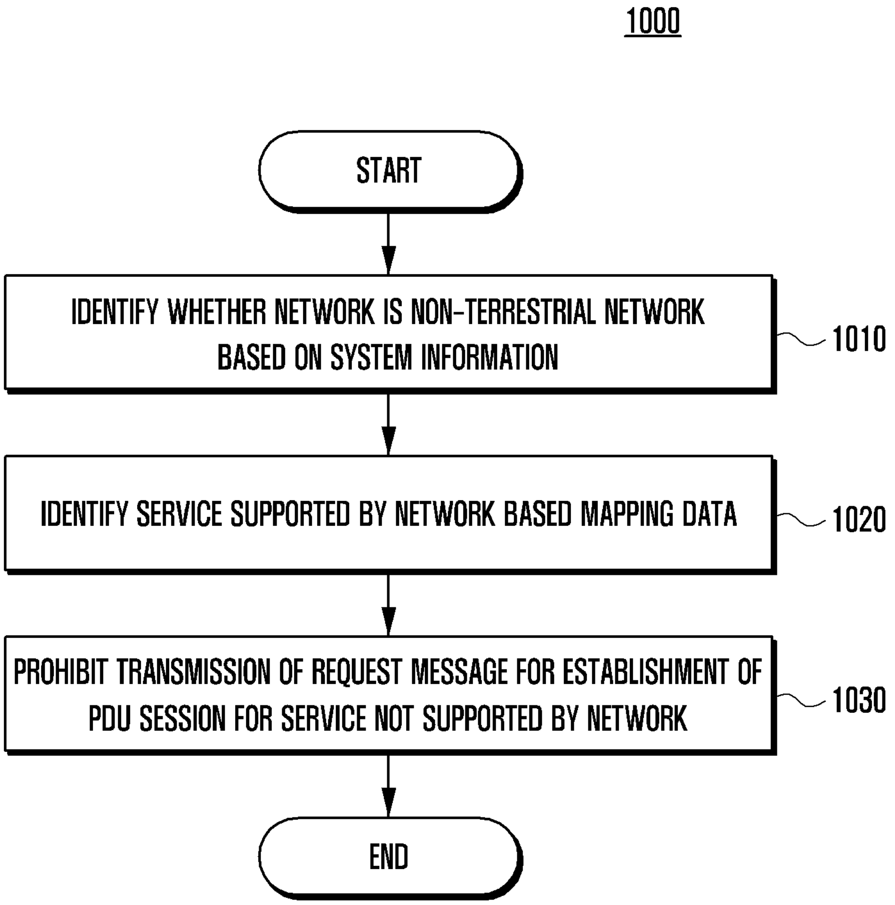
FIG. 10 is an operational flowchart illustrating an operation method of an electronic device according to an embodiment.

FIG. 10 is an operational flowchart 1000 illustrating an operation method of an electronic device according to an embodiment.

An electronic device (e.g., the electronic device 101 or the communication processor 620 in FIG. 6) may identify whether the network is a non-terrestrial network, based on system information, in operation 1010.

The electronic device 101 may control a communication circuit (e.g., the communication circuit 610 in FIG. 6) to search for a network for connection to the network. If searching for the network is successful, the electronic device 101 may perform a series of procedures to connect to the searched network.

The electronic device 101 may receive system information transmitted or broadcast by a node (e.g., the satellite 520 in FIG. 5) included in the network (e.g., a non-terrestrial network) while performing searching for the network.

The electronic device 101 may identify whether the searched network is a non-terrestrial network, based on the received system information.

The system information broadcast by the node 520 may include a variety of information. According to an example, the system information may include SIB 1 defined in 3GPP TS. 36.331 v15.6. SIB 1 may include identification information (e.g., mobile country code (MCC) and public land mobile network (PLMN)) of the network including the node 520, information required to perform access (or random access (RA)) to the node 520, and/or information indicating that the network is a non-terrestrial network (e.g., cellBarredNTN information element (IE)).

If it is identified that the identification information of the network included in the system information transmitted or broadcast by the node 520 is specified identification information (e.g., identification information of a non-terrestrial network), the electronic device 101 may identify that the searched network is a non-terrestrial network.

The electronic device 101 may identify that the searched network is a non-terrestrial network, based on information indicating that the network included in the system information transmitted or broadcast by the node 520 is a non-terrestrial network. According to an example, the electronic device 101 may identify that the searched network is a non-terrestrial network, based on identifying that the cellBarredNTN information element (IE) is indicated as not barred. The electronic device 101 may identify that the searched network is a terrestrial network, based on identifying that the cellBarredNTN information element (IE) is indicated as barred or that the cellBarredNTN IE is not included in the system information.

According to an example, the system information may include SIB 19 defined in 3GPP TS. 38.304. SIB 19 may include system information transmitted or broadcast when the network including the node 520 is a non-terrestrial network and may include information related to the non-terrestrial network (e.g., altitude information of the node 520 and movement speed information of the node 520). For example, the node transmitting or broadcasting SIB 19 may be a node included in the non-terrestrial network. If the system information transmitted or broadcast by the node 520 is SIB 19, the electronic device 101 may identify that the searched network is a non-terrestrial network.

In operation 1020, the electronic device 101 may identify services supported by the network, based on mapping data.

The electronic device 101 may identify that the searched network is a non-terrestrial network and identify services supported (or services not supported) by the searched network, based on mapping data stored in the memory 630.

The mapping data may include data in which the identification information of the non-terrestrial network and information of services supported by the non-terrestrial network are mapped and stored.

Referring to Table 1, the mapping data may be data obtained by mapping a specific network to whether services are supported. For example, the electronic device 101, based on the mapping data, may identify that the first network (991-01) supports the SMS service but does not support the MMS service, user data transmission and/or reception service, and satellite PDU service. For example, the electronic device 101, based on the mapping data, may identify that the second network (992-02) supports the SMS service and MMS service but does not support the user data transmission and/or reception service and satellite PDU service. For example, the electronic device 101, based on the mapping data, may identify that the third network (993-03) supports the SMS service, MMS service, and user data transmission and/or reception service but does not support the satellite PDU service. For example, the electronic device 101, based on the mapping data, may identify that the fourth network (994-04) supports the SMS service, MMS service, and satellite PDU service but does not support the user data transmission and/or reception service. The satellite PDU service is a service for transmitting and/or receiving user data using a PDU capable of being used only by the non-terrestrial network, and may refer to a service for transmitting and/or receiving user data using a PDU incapable of being accessed through the terrestrial network.

In operation 1030, the electronic device 101 may prohibit (or refrain from) transmitting, to the network, a request message for establishment of a PDU session for a service that is not supported by the network.

The electronic device 101 may not transmit a request message for the establishment of a PDU session for a service, which is not supported by the network, to the network. The electronic device 101 may prohibit transmitting a request message for the establishment of a PDU session for a service, which is not supported by the network, to the network. The electronic device 101 may reduce unnecessary consumption of resources due to transmission of a request message for establishing a PDU session by not transmitting a request message for the establishment of a PDU session for a service, which is not supported by the network, to the network.

According to an example, the electronic device 101 may be connected to the network through first cellular communication. The first cellular communication may support the transmission or reception of SMS through a non-access stratum (NAS), and thus the first cellular communication may not require establishment of a separate PDU session for the SMS service.

The electronic device 101 may identify, based on the mapping data, that the network connected through the first cellular communication supports only the SMS service (e.g., the first network) and may not transmit a signal requesting establishment of a separate PDU session to the node 520. Accordingly, the electronic device 101 may reduce unnecessary resource consumption or delay time caused by reception of a reject message that occurs when a signal requesting the establishment of a PDU session is transmitted to the network that does not support transmission and/or reception of data through the PDU session.

According to an example, the electronic device 101 may be connected to the network through second cellular communication. The second cellular communication may require establishment of a PDU session for the transmission and reception of SMS.

The electronic device 101 may identify, based on the mapping data, that the network connected through the second cellular communication supports only the SMS service (e.g., the first network) and transmit a signal requesting establishment of a PDU session for the SMS service to the node 520. However, the electronic device 101 may not transmit, to the node 520, a signal requesting establishment of separate PDU sessions for services other than the SMS service. Accordingly, the electronic device 101 may reduce unnecessary resource consumption or delay time caused by reception of a reject message that occurs when a signal requesting the establishment of a PDU session is transmitted to a network that does not support data transmission and/or reception through the PDU session.

The electronic device 101 may identify, based on the mapping data, that the network connected through the first cellular communication or the second cellular communication supports the SMS service and the MMS service but does not support the transmission or reception of user data (e.g., the second network) and transmit a signal requesting establishment of a PDU session for the MMS service to the node 520. However, the electronic device 101 may not transmit, to the node 520, a signal requesting establishment of separate PDU sessions for services (e.g., the user data transmission or reception service) other than the MMS service. Accordingly, the electronic device 101 may reduce unnecessary resource consumption or delay time caused by reception of a reject message that occurs when a signal requesting the establishment of a PDU session is transmitted to a network that does not support the user data transmission and/or reception through the PDU session.

The electronic device 101 may identify, based on the mapping data, that the network connected through the first cellular communication or the second cellular communication supports the SMS service, MMS service, and transmission or reception of user data (e.g., the third network) and transmit, to the node 520, a signal requesting establishment of a PDU session for the MMS service and/or a signal requesting establishment of a PDU session for the user data transmission or reception service. The electronic device 101 may perform a series of procedures for establishing a PDU session for the user data transmission or reception service after transmitting the signal requesting the establishment of a PDU session for the user data transmission or reception service. The electronic device 101 may transmit data to the network or receive data from the network through the PDU session for the user data transmission or reception service.

However, the electronic device 101 may prohibit transmission and/or reception of user data by applications other than a specified application. The electronic device 101 may pre-specify an application capable of performing the data transmission or reception through a non-terrestrial network, and the electronic device 101 may prohibit applications other than the specified application from transmitting or receiving user data. According to an example, the electronic device 101 may not transmit user data generated by applications other than the specified application through the PDU session for the user data transmission or reception service.

The electronic device 101 may identify, based on the mapping data, that the network connected through the first cellular communication or the second cellular communication supports the SMS service, MMS service, and transmission or reception of user data through a satellite PDU (e.g., the fourth network) and transmit a signal requesting establishment of a satellite PDU session to the node 520. The electronic device 101 may prohibit transmission of a signal requesting the establishment of a PDU session for transmitting or receiving user data. The electronic device 101 may transmit a signal requesting the establishment of a satellite PDU session and then perform a series of procedures for establishing the satellite PDU session. The electronic device 101 may transmit data to the network or receive data from the network through the satellite PDU session.

However, the electronic device 101 may prohibit transmission and/or reception of user data by applications other than a specified application. The electronic device 101 may pre-specify an application capable of performing the data transmission or reception through a non-terrestrial network, and the electronic device 101 may prohibit applications other than the specified application from transmitting or receiving user data. According to an example, the electronic device 101 may not transmit user data generated by applications other than the specified application through the satellite PDU session.

As described above, the electronic device 101 may not transmit a message requesting the establishment of a PDU session for a service, which is not supported by the non-terrestrial network, to the node 520, thereby reducing unnecessary consumption of resources or delay time caused by reception of a reject message that occurs when a signal requesting the establishment of a PDU session for a service, which is not supported by the non-terrestrial network, is transmitted.

An electronic device according to an example embodiment may include a communication circuit configured to support cellular communication through a terrestrial network and a non-terrestrial network. The electronic device may include a memory configured to store mapping data in which identification information of the non-terrestrial network and services supported by the non-terrestrial network are mapped. The electronic device may include a communication processor. The communication processor may identify, while connecting to a network through a node, whether the network including the node is the non-terrestrial network, based on system information received from the node. The communication processor may identify, based on the network being the non-terrestrial network, services supported by the network, based on the mapping data. The communication processor may be configured to prohibit transmission of a request message for establishment of a packet data unit (PDU) session for a service, which is not supported by the network, to the network.

In the electronic device according to an example embodiment, the communication processor may be configured to transmit, to the network, a request message for establishment of a PDU session for a service supported by the network.

In the electronic device according to an example embodiment, the communication processor may be configured to prohibit, based on the non-terrestrial network being a network that supports only a short message service (SMS), transmission of a request for establishment of a protocol data unit (PDU) session between the electronic device and the non-terrestrial network to the non-terrestrial network.

In the electronic device according to an example embodiment, the communication processor may be configured to prohibit, based on the non-terrestrial network being a network that supports only a short message service (SMS) and a multimedia messaging service (MMS), transmitting, to the non-terrestrial network, requests for establishment of sessions other than the session for transmitting data related to the MMS between the electronic device and the non-terrestrial network.

In the electronic device according to an example embodiment, the communication processor may be configured to receive, based on the non-terrestrial network being a network that supports transmission and/or reception of data (e.g., user data) through the node, a signal to prohibit transmission and/or reception of the data by applications other than a specified application from an application processor of the electronic device.

In the electronic device according to an example embodiment, the communication processor may receive a UE capability request message from the network. Based on the network being the non-terrestrial network, the communication processor may be configured to transmit UE capability information that does not include information indicating a combination of frequency bands supported by the electronic device to the network.

In the electronic device according to an example embodiment, the communication processor may be configured to transmit, to the network, UE capability information that does not include information that is not related to the non-terrestrial network.

In the electronic device according to an example embodiment, the communication processor may be configured to transmit UE capability information, excluding data related to cellular communication that is not supported by the non-terrestrial network, to the network.

In the electronic device according to an example embodiment, the communication processor may receive system information including information related to the non-terrestrial network from the node. The communication processor may identify the altitude of the node, based on the system information. The communication processor may determine whether to perform a specified service, based on whether the altitude is greater than or equal to a specified value.

In the electronic device according to an example embodiment, the specified service may include services that require a low delay time.

In the electronic device according to an example embodiment, the specified service may include voice call services or video call services.

A method of operating an electronic device according to an example embodiment may include identifying, while connecting to a network through a node, whether the network including the node is a non-terrestrial network, based on system information received from the node. The method of an electronic device may include identifying, based on the network being the non-terrestrial network, services supported by the network, based on mapping data in which identification information of the non-terrestrial network and services supported by the non-terrestrial network are mapped. The method of an electronic device may prohibit transmission of a request message for establishment of a packet data unit (PDU) session for a service, which is not supported by the network, to the network.

The method of operating an electronic device according to an example embodiment may further include transmitting, to the network, a request message for establishment of a PDU session for a service supported by the network.

In the method of operating an electronic device according to an example embodiment, the prohibiting of transmission of a request message for establishment of a packet data unit (PDU) session to the network may include prohibiting, based on the non-terrestrial network being a network that supports only a short message service (SMS), transmission of a request for establishment of a protocol data unit (PDU) session between the electronic device and the non-terrestrial network to the non-terrestrial network.

In the method of operating an electronic device according to an example embodiment, the prohibiting of transmission of a request message for establishment of a packet data unit (PDU) session to the network may include prohibiting, based on the non-terrestrial network being a network that supports only a short message service (SMS) and a multimedia messaging service (MMS), transmitting, to the non-terrestrial network, requests for establishment of sessions other than the session for transmitting data related to the MMS between the electronic device and the non-terrestrial network.

The method of operating an electronic device according to an example embodiment may further include, based on the non-terrestrial network being a network that supports transmission and/or reception of data through the node, prohibiting transmission and/or reception of the data by applications other than a specified application.

The method of operating an electronic device according to an example embodiment may further include receiving a UE capability request message from the network. The operation method of an electronic device may further include, if the network is the non-terrestrial network, transmitting UE capability information that does not include information indicating a combination of frequency bands supported by the electronic device to the network.

In the method of operating an electronic device according to an example embodiment, the transmitting of the UE capability information to the network may include transmitting UE capability information that does not include information that is not related to the non-terrestrial network to the network.

In the method of operating an electronic device according to an example embodiment, the transmitting of the UE capability information to the network may include transmitting UE capability information, excluding data related to cellular communication that is not supported by the non-terrestrial network, to the network.

The method of operating an electronic device according to an example embodiment may further include receiving system information including information related to the non-terrestrial network from the node. The method of operating an electronic device may further include identifying the altitude of the node, based on the system information. The method of operating an electronic device may further include determining whether to perform a specified service, based on whether the altitude is greater than or equal to a specified value.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used herein, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
- a communication circuit configured to support cellular communication through a terrestrial network and a non-terrestrial network;
- a memory configured to store mapping data in which identification information of the non-terrestrial network and services supported by the non-terrestrial network are mapped; and
- a processor,
- wherein the processor is configured to:
- identify, based on the mapping data, a service supported by the non-terrestrial network to be connected, when performing a connection procedure to the non-terrestrial network; and
- prohibit transmission of a request message for connection establishment for a service, which is not supported by the non-terrestrial network, to the non-terrestrial network.

2. The electronic device of claim 1, wherein the processor is configured to transmit, to the non-terrestrial network, a request message for connection establishment for a service supported by the network.

3. The electronic device of claim 1, wherein the processor is configured to, based on the non-terrestrial network being a NR(New Radio) non-terrestrial network that supports only a short message service (SMS), prohibit transmission of a request for connection establishment to the non-terrestrial network.

4. The electronic device of claim 1, wherein the processor is configured to, based on the non-terrestrial network being a LTE(Long-Term Evolution) based network that supports only a short message service (SMS) and a multimedia messaging service (MMS), prohibit transmitting, to the non-terrestrial network, requests for establishment of an internet PDN (Packet Data Network) other than a default PDN for transmitting data related to the MMS between the electronic device and the non-terrestrial network.

5. The electronic device of claim 1, wherein the processor is configured to, based on that the non-terrestrial network supports transmission and/or reception of data through the node, prohibit transmission and/or reception of the data by applications other than a specified application.

6. The electronic device of claim 1, wherein the processor is configured to receive a user equipment (UE) capability request message from the network, and
- transmit UE capability information that does not comprise information indicating a combination of frequency bands supported by the electronic device to the network.

7. The electronic device of claim 6, wherein the processor is configured to transmit, to the network, UE capability information that does not comprise information that is not related to the non-terrestrial network.

8. The electronic device of claim 6, wherein the processor is configured to transmit UE capability information, excluding data related to cellular communication that is not supported by the non-terrestrial network, to the network.

9. The electronic device of claim 1, wherein the processor is configured to:
- receive system information comprising information related to the non-terrestrial network from the node;
- identify an altitude of the node, based on the system information; and
- determine whether to perform a specified service, based on whether the altitude is greater than or equal to a specified value.

10. The electronic device of claim 8, wherein the specified service comprises voice call services or video call services.

11. A method of operating an electronic device, the method comprising:
- identifying, while connecting to a network through a node, whether the network comprising the node is the non-terrestrial network, based on system information received from the node;
- identifying, based on the network being the non-terrestrial network, services supported by the network, based on mapping data in which identification information of the non-terrestrial network and
- services supported by the non-terrestrial network are mapped; and
- prohibiting transmission of a request message for establishment of a packet data unit (PDU) session for a service, which is not supported by the network, to the network;
- wherein the prohibiting of transmission of a request message for establishment of a packet data unit (PDU) session to the network comprises, based on the non-terrestrial network being a network that supports only a short message service (SMS) and
- a multimedia messaging service (MMS), prohibiting transmitting, to the non-terrestrial network, requests for establishment of sessions other than the session for transmitting data related to the MMS between the electronic device and the non-terrestrial network.

12. A method of operating an electronic device, the method comprising:
- identifying, based on mapping data in which identification information of non-terrestrial network and services supported by the non-terrestrial network are mapped, a service supported by the non-terrestrial network to be connected, when performing a connection procedure to the non-terrestrial network; and
- prohibiting transmission of a request message for connection establishment for a service, which is not supported by the non-terrestrial network, to the non-terrestrial network.

13. The method of operating an electronic device of claim 12, further comprising transmitting, to the non-terrestrial network, a request message for connection establishment for a service supported by the non-terrestrial network.

14. The method of operating an electronic device of claim 12, wherein the prohibiting of transmission of a request message for connection establishment to the non-terrestrial network comprises, based on the non-terrestrial network being a NR (new radio) network that supports only a short message service (SMS), prohibiting transmission of a request for connection establishment to the non-terrestrial network.

15. The method of operating an electronic device of claim 12, wherein the prohibiting of transmission of a request message for connection establishment to the non-terrestrial network comprises, based on the non-terrestrial network being an LTE (long term evolution) based network that supports only a short message service (SMS) and a multimedia messaging service (MMS), prohibiting transmitting, to the non-terrestrial network, requests for establishment of an internet PDN(packet data network) other than a default PDN for transmitting data related to the MMS between the electronic device and the non-terrestrial network.

16. The method of operating an electronic device of claim 12, further comprising, based on that the non-terrestrial network supports transmission and/or reception of data through the node, prohibiting transmission and/or reception of the data by applications other than a specified application.

17. The method of operating an electronic device of claim 12, further comprising:

receiving a user equipment (UE) capability request message from the network; and transmitting UE capability information that does not comprise information indicating a combination of frequency bands supported by the electronic device to the network.

18. The method of operating an electronic device of claim 17, wherein the transmitting of the UE cpaability information to the network comprises transmitting UE capability information that does not comprise information that is not related to the non-terrestrial network to the network.

19. The method of operating an electronic device of claim 17, wherein the transmitting of the UE cpaability information to the network comprises transmitting UE capability information, excluding data related to cellular communication that is not supported by the non-terrestrial network, to the network.

20. The method of operating an electronic device of claim 12, further comprising:

receiving system information comprising information related to the non-terrestrial network from the node;

identifying an altitude of the node, based on the system information; and determining whether to perform a specified service, based on whether the altitude is greater than or equal to a specified value.

* * * * *